(12) United States Patent
Kumkar et al.

(10) Patent No.: US 10,882,143 B2
(45) Date of Patent: Jan. 5, 2021

(54) SYSTEM FOR ASYMMETRIC OPTICAL BEAM SHAPING

(71) Applicant: TRUMPF Laser- und Systemtechnik GmbH, Ditzingen (DE)

(72) Inventors: Malte Kumkar, Ditzingen (DE); Jonas Kleiner, Ditzingen (DE); Daniel Grossmann, Ditzingen (DE); Daniel Flamm, Ditzingen (DE); Myriam Kaiser, Ditzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 533 days.

(21) Appl. No.: 15/599,720

(22) Filed: May 19, 2017

(65) Prior Publication Data

US 2017/0252859 A1    Sep. 7, 2017

Related U.S. Application Data

(63) Continuation of application No. PCT/EP2015/077172, filed on Nov. 19, 2015.

(30) Foreign Application Priority Data

Nov. 19, 2014 (DE) .......................... 10 2014 116 957
Nov. 19, 2014 (DE) .......................... 10 2014 116 958

(51) Int. Cl.
*B23K 26/53* (2014.01)
*G02B 5/00* (2006.01)
(Continued)

(52) U.S. Cl.
CPC ............ *B23K 26/53* (2015.10); *B23K 26/042* (2015.10); *B23K 26/046* (2013.01); *B23K 26/06* (2013.01);
(Continued)

(58) Field of Classification Search
CPC .... B23K 26/042; B23K 26/046; B23K 26/06; B23K 26/064; B23K 26/073; B23K 26/53; G02B 27/095; G02B 5/001
(Continued)

(56) References Cited

U.S. PATENT DOCUMENTS 5,328,785 A    7/1994   Smith et al.
5,656,186 A    8/1997   Mourou et al.
(Continued)

FOREIGN PATENT DOCUMENTS

CN    102656421        9/2012
DE    100 62 453 A1    7/2002
(Continued)

OTHER PUBLICATIONS

International Search Report PCT/EP2015/076707 dated Feb. 19, 2016.
(Continued)

*Primary Examiner* — Dana Ross
*Assistant Examiner* — Joseph W Iskra
(74) *Attorney, Agent, or Firm* — Fish & Richardson P.C.

(57) ABSTRACT

For material processing of a material, which is in particular for a laser beam to a large extent transparent, asymmetric shaped modifications are created transverse to the propagation direction of the laser beam. Thereby, the laser beam is shaped for forming an elongated focus zone in the material, wherein the focus zone is such that it includes at least one intensity maximum, which is transverse flattened in a flattening direction, or a transverse and/or axial sequence of asymmetric intensity maxima, which are flattened in a sequence direction. After positioning the focus zone in the material, a modification is created and the material and the focus zone are moved relative to each other in the or across to the flattening direction or in the or across to the sequence
(Continued)

US 10,882,143 B2

Page 2 direction for forming a crack along an induced preferred direction.

27 Claims, 16 Drawing Sheets

(51) Int. Cl.
G02B 27/09 (2006.01)
B23K 26/064 (2014.01)
B23K 26/06 (2014.01)
B23K 26/042 (2014.01)
B23K 26/046 (2014.01)
B23K 26/073 (2006.01)

(52) U.S. Cl.
CPC .......... B23K 26/064 (2015.10); B23K 26/073 (2013.01); G02B 5/001 (2013.01); G02B 27/095 (2013.01)

(58) Field of Classification Search
USPC ...................................................... 219/121.6
See application file for complete search history.

(56) References Cited

U.S. PATENT DOCUMENTS

| | | | |
|---|---|---|---|
| 6,185,168 | B1 | 2/2001 | Kato et al. |
| 6,285,001 | B1 | 9/2001 | Fleming et al. |
| 6,552,301 | B2 | 4/2003 | Herman et al. |
| 7,482,776 | B2 | 1/2009 | Scholich-Tessmann |
| 7,566,635 | B2 | 7/2009 | Fujii et al. |
| 8,268,704 | B2 | 9/2012 | Fujii et al. |
| 8,304,325 | B2 | 11/2012 | Fujii et al. |
| 8,314,013 | B2 | 11/2012 | Fujii et al. |
| 8,518,800 | B2 | 8/2013 | Fujii et al. |
| 8,518,801 | B2 | 8/2013 | Fujii et al. |
| 8,519,511 | B2 | 8/2013 | Fujii et al. |
| 8,946,586 | B2 | 2/2015 | Bea et al. |
| 10,310,287 | B2 | 6/2019 | Ellenbogen et al. |
| 2002/0040892 | A1 | 4/2002 | Koyama et al. |
| 2003/0052102 | A1 | 3/2003 | Amako et al. |
| 2003/0102291 | A1* | 6/2003 | Liu ................. B23K 26/04 219/121.73 |
| 2004/0240063 | A1 | 12/2004 | Delage |
| 2010/0065537 | A1 | 3/2010 | Watatani et al. |
| 2010/0176102 | A1 | 7/2010 | Petring et al. |
| 2010/0206857 | A1 | 8/2010 | Bea et al. |
| 2010/0288740 | A1 | 11/2010 | Komiya et al. |
| 2012/0329247 | A1 | 12/2012 | Sakamoto |
| 2014/0199519 | A1* | 7/2014 | Schillinger ........ B23K 26/0648 428/155 |
| 2015/0158120 | A1 | 6/2015 | Courvoisier et al. |
| 2015/0166393 | A1 | 6/2015 | Marjanovic et al. |
| 2016/0031745 | A1 | 2/2016 | Ortner et al. |
| 2016/0052082 | A1 | 2/2016 | Schulz et al. |
| 2016/0129526 | A1 | 5/2016 | Russ et al. |
| 2016/0152508 | A1 | 6/2016 | Kumkar |
| 2016/0259175 | A1 | 9/2016 | Ellenbogen et al. |
| 2017/0192246 | A9 | 7/2017 | Popovich et al. |
| 2017/0252859 | A1 | 9/2017 | Kumkar et al. |
| 2017/0276951 | A1 | 9/2017 | Kumkar et al. |

FOREIGN PATENT DOCUMENTS

| | | |
|---|---|---|
| DE | 600 11 634 T2 | 6/2005 |
| DE | 10 2007 024 700 | 12/2008 |
| DE | 102012110971 * | 5/2014 |
| DE | 102012110971 A1 | 5/2014 |
| DE | 10 2014 116 957 | 5/2016 |
| DE | 10 2014 116 958 | 5/2016 |
| EP | 0735527 | 10/1996 |
| EP | 1 212 166 B1 | 3/2001 |
| EP | 1 386 689 A1 | 11/2002 |
| EP | 2 202 545 A1 | 6/2010 |
| EP | 2 754 524 A1 | 7/2014 |
| FR | 2 823 688 A1 | 10/2002 |
| FR | 2 977 513 A1 | 1/2013 |
| JP | 2005-288503 A | 10/2005 |
| JP | 2005288503 | 10/2005 |
| JP | 2008-137029 A | 6/2008 |
| KR | 2011-0106360 | 9/2011 |
| WO | WO 95/30932 | 11/1995 |
| WO | WO 01/21353 | 3/2001 |
| WO | WO 2009/040103 | 4/2009 |
| WO | WO 2010/071128 | 6/2010 |
| WO | WO 2012/006736 | 1/2012 |
| WO | WO 2012/041711 | 4/2012 |
| WO | WO 2013/006736 | 1/2013 |
| WO | WO 2013/138802 | 9/2013 |
| WO | WO 2014/111794 | 7/2014 |
| WO | WO 2014/154337 | 10/2014 |
| WO | WO 2014/154342 | 10/2014 |
| WO | WO 2014/154345 | 10/2014 |
| WO | WO 2015/075059 | 5/2015 |
| WO | WO2016005455 A1 | 1/2016 |
| WO | WO 2016/079062 | 5/2016 |
| WO | WO 2016/079063 | 5/2016 |
| WO | WO 2016/079275 | 5/2016 |

OTHER PUBLICATIONS

Examination Report DE 10 2014 116 958.1 (priority application to PCT/EP2015/076708 dated Jul. 15, 2015.
International Search Report PCT/EP2015/076708 dated Feb. 8, 2016.
International Search Report PCT/EP2015/077172 dated Mar. 9, 2016.
Examination Report DE 10 2014 116 957.3 (priority application to PCT/EP2015/076707) dated Jul. 15, 2015.
Chremmos et al., "Bessel-like optical beams with arbitrary trajectories", Dec. 1, 2012, vol. 37, No. 23, Optics Letters.
Čižmár et al., "Tunable Bessel light modes: engineering the ax-ial propagation", Aug. 31, 2009, vol. 17, No. 18, Optics Express 15558.
Du et al., "Generation of three-dimensional optical bottle beams via focused non-diffracting Bessel beam using an axicon", Optics Communications 317 (2014) 24-28.
Duocastella et al., "Bessel and annular beams for materials processing", Laser Photonics Rev. 6, No. 5, 607-621 (2012)/DOI 10.1002/1por.201100031.
Grewel et al., "Diffractive optics as beam-shaping elements for plastics laser welding", Optical Engineering 46(11), 118001 (Nov. 2007).
Leach et al., "Generation of achromatic Bessel beams using a compensated spatial light modulator", Jun. 12, 2006, vol. 14, No. 12, Optics Express 5581.
Siviloglou et al., "Observation of Accelerating Airy Beams", PRL 99, 213901 (2007).
Valle et al.,"Analytic design of multiple-axis, multifocal diffractive lenses", Mar. 15, 2012, vol. 37, No. 6, Optics Letters.
Zhu et al., "Three-dimensional shape-controllable focal spot array created by focusing vortex beams modulated by multi-value pure-phase grating", Sep. 8, 2014, vol. 22, No. 18, DOI:10.1364/OE.22.021354, Optics Express 21354.
German National Office Action in Application No. DE 10 2014 116 957.3, dated Jul. 15, 2015, 4 pages (English translation).
German National Office Action in Application No. DE 10 2014 116 958.1, dated Jul. 15, 2015, 3 pages (English translation).
Office Action in Chinese Application No. 201580063156.7, dated Jan. 18, 2019, 10 pages (with English translation).
Office Action in Korean Application No. 10-2017-7016685, dated Jan. 31, 2019, 10 pages (with English translation).
CN Office Action in Chinese Appln. No. 20150063156.7, dated Oct. 9, 2019, 16 pages (with English translation).
CN Office Action in Chinese Appln. No. 201580063154.8, dated Nov. 5, 2019, 8 pages (with English translation).
KR Office Action in Korean Appln. No. 10-2017-7016685, dated Sep. 30, 2019, 7 pages (with English translation).

(56) References Cited

OTHER PUBLICATIONS

CN Office Action in Chinese Appln. No. 201580063156.7, dated Oct. 9, 2019, 16 pages (with English translation).
CN Office Action in Chinese Appln. No. 201580063156.7, dated Apr. 8, 2020, 14 pages (with English translation).

* cited by examiner

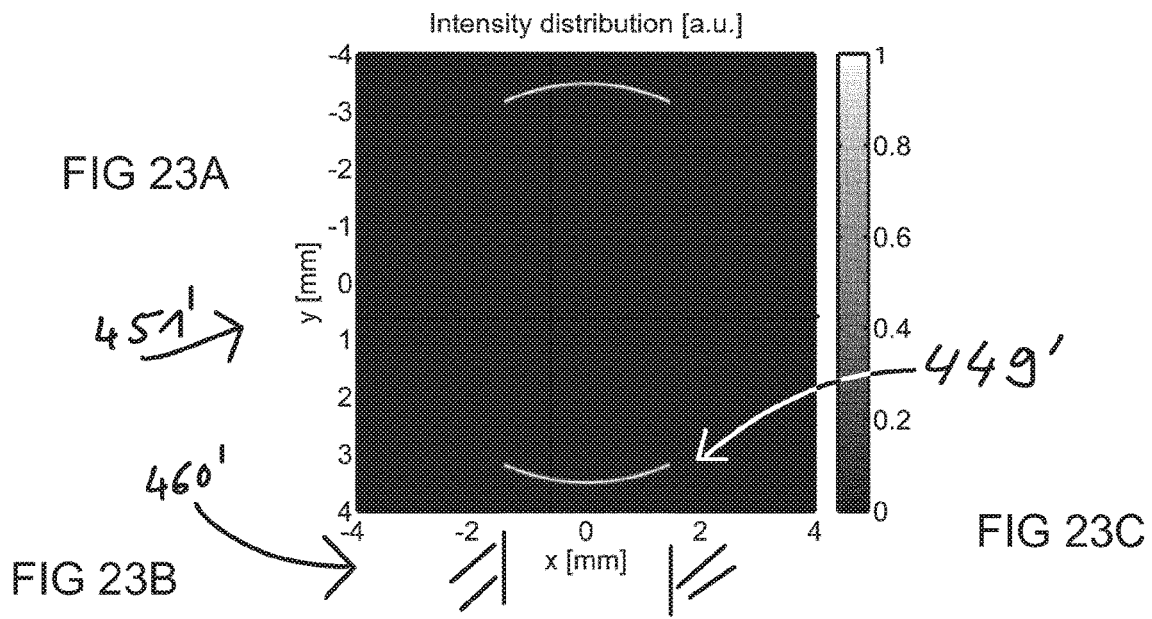
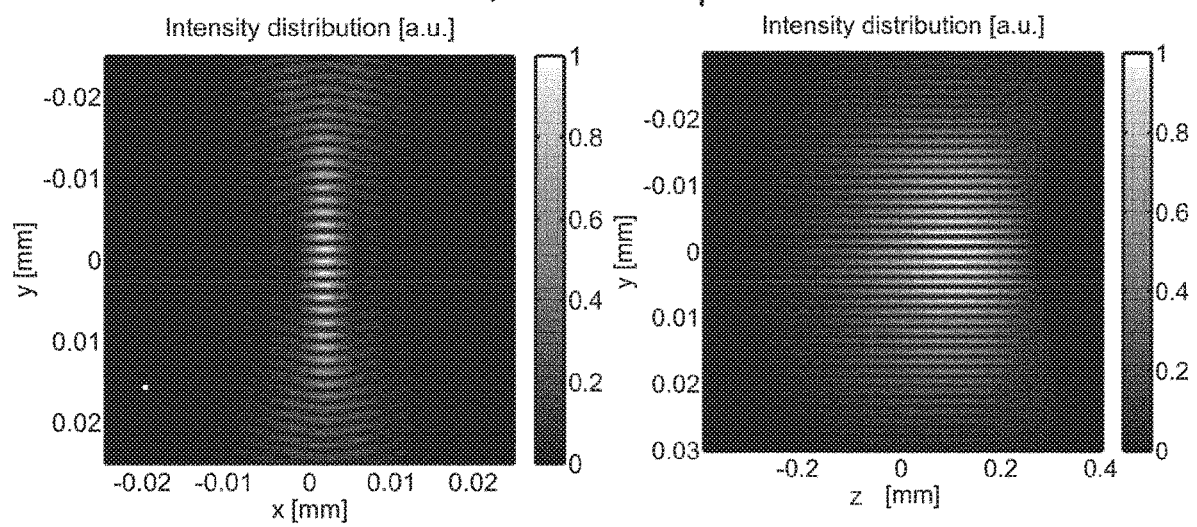
FIG 23A
FIG 23B
FIG 23C
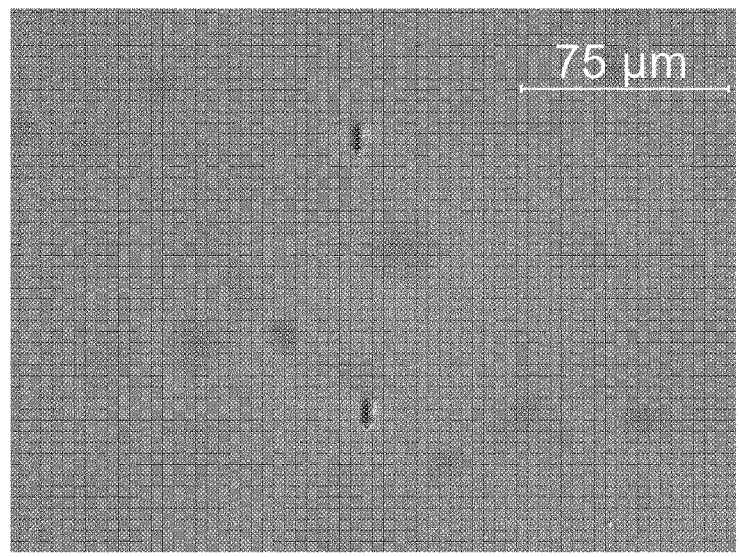
FIG 23D

SYSTEM FOR ASYMMETRIC OPTICAL BEAM SHAPING

CROSS-REFERENCE TO RELATED APPLICATIONS

This application is a continuation of and claims priority under 35 U.S.C. § 120 to PCT Application No. PCT/EP2015/077172 filed on Nov. 19, 2015, which claims priority to German Application No. 10 2014 116 957.3, filed on Nov. 19, 2014 and German Application No. 10 2014 116 958.1, filed on Nov. 19, 2014. The entire contents of these priority applications are incorporated herein by reference.

TECHNICAL FIELD

The present invention relates to diffractive optical elements that are used in optical systems for beam shaping a laser beam and in particular for beam shaping a laser beam for processing materials that are essentially transparent for the laser beam. Moreover, the invention relates to a system and a method for laser material processing.

BACKGROUND

There are many possibilities for using absorption of light for processing a work-piece, in particular by introducing localized modifications into the work-piece. The so-called volume absorption, i.e., an absorption that is not limited to the surface, opens the possibility to process brittle-hard materials that are essentially transparent for the laser beam. Generally, volume absorption benefits from a kind of non-linear absorption, at which an interaction with the material takes place only at a material dependent (threshold) intensity.

SUMMARY

Herein, a nonlinear absorption is understood as an intensity dependent absorption of light, that is not primarily based on the direct absorption of the light. Instead it is based on an increase of the absorption during interaction with the incident light, often a temporally limited laser pulse. Thereby, electrons can absorb that much energy by inverse bremsstrahlung that further electrons are set free by impacts, so that the rate of generating electrons overcomes that rate of recombination. Under specific conditions, those initial electrons, which are required for the avalanche-like absorption, may already be present from the start or may be generated by an existing rest-absorption by linear absorption. For example, for ns-laser pulses, an initial ionization may result in an increase in temperature that causes an increase of the number of free electrons and therefore of the following absorption. Under other conditions, such initial electrons may be generated by multi-photon ionization or tunnel ionization as examples of well-known nonlinear absorption mechanisms. For ultrashort laser pulses with, for example, sub-ns-pulse durations such an avalanche-like generation of electrons can be utilized.

A volume absorption may be used for materials, which are essentially transparent for the laser beam (herein in short referred to as transparent materials), for forming a modification of the material in an elongated focus zone. Such modifications may allow separating, drilling, or structuring of the material. For separating, for example, rows of modifications may be generated that cause a breaking within or along the modifications. Moreover, it is known to generate modifications for separating, drilling, and structuring that allow a selective etching of the modified areas (SLE: selective laser etching).

The generation of an elongated focus zone can be affected with the help of apodized Bessel beams (herein also referred to as quasi-Bessel beam). Such beam profiles may be formed, for example, with an axicon or a spatial light modulator (SLM: spatial light modulator) and an incident light beam having a Gaussian beam profile. A subsequent imaging into a transparent work-piece results in the intensities required for volume absorption. Quasi-Bessel beams—like Bessel beams—usually have a ring-shaped intensity distribution in the far field of the beam profile existing within the work-piece. Calculating phase distributions for beam shaping quasi-Bessel beams, e.g., with an SLM is disclosed in Leach et al., "Generation of achromatic Bessel beams using a compensated spatial light modulator," Opt. Express 14, 5581-5587 (2006), the entire contents of which are incorporated by reference.

Moreover, systems are known for forming a line of intensity enhancements, e.g., with the help of multifocal lenses. Thereby, a phase modification of the laser beam to be focused is performed in the far field, i.e., during focusing, whereby the phase modification results in the formation of longitudinally displaced focus zones.

An aspect of the present disclosure has the objective to improve processing quality of laser material processing with elongated focus zones as they can be generated, for example, with a diffractive optical beam shaping element. In particular, the objective is, for laser processing applications, to provide in beam propagation direction elongated, slender beam profiles with a high aspect ratio for processing transparent materials such that a separating or cutting process can be performed with an increased precision of the cutting edge.

At least one of the objectives is solved by the methods, the optical systems, and the laser processing machines of the independent claims. Further developments are given in the dependent claims.

In an aspect, modifications are generated for material processing a material with a pulsed laser beam, wherein the material is in particular to a large extent transparent for the laser beam and the modifications are formed asymmetric transverse to a propagation direction of the laser beam. Thereby, the laser beam is shaped for forming an elongated focus zone in the material, wherein the focus zone is configured such that it includes at least one intensity maximum, which is transverse flattened in a flattening direction, or a transverse and/or axial sequence of asymmetric intensity maxima, which are flattened in a flattening direction. After the positioning of the focus zone in the material, a modification is generated, and the material and the focus zone are moved relative to each other in or across to the flattening direction or in or across to the sequence direction.

In embodiments, a diffractive optical beam shaping element is used for imposing a phase distribution on the laser beam, which is intended for laser processing a material, wherein the beam shaping element includes an (areally configured) phase mask, which is configured for imposing one or more beam shaping phase distributions on the laser beam, which is incident on the phase mask. A virtual or real optical image is attributed to at least one beam shaping phase distribution, wherein the optical image is imagable in an elongated focus zone for forming a modification in the material (9) to be processed.

In a further aspect, a method for guiding a crack during laser processing for processing a material, which is to a large extent transparent for a pulsed laser beam includes the following step for separating or preparing the separation of the material generating modifications in the material by focusing the laser beam in an asymmetric focus zone of the pulsed laser beam, wherein successive modifications are displaced with respect to each other along a relative movement direction between laser beam propagation direction and material, and each of the modifications includes a preferred direction in the crack formation, and the relative movement direction and the preferred direction are adapted to each other.

In a further aspect, an optical system for beam shaping of a laser beam for processing a material, which is in particular for the laser beam to a large extent transparent, by modifying the material in a focus zone, which is elongated in a propagation direction and in a further direction transverse to the propagation direction, includes an optical element, which is configured to shape the focus zone in propagation direction, wherein the optical element, which is configured to shape the focus zone in propagation direction, additionally shapes the focus zone in a further direction transverse to the propagation direction, or wherein a further optical element, which is configured to shape the focus zone in a further direction transverse to the propagation direction, is positioned downstream of the optical element configured to shape the focus zone in propagation direction.

In a further aspect, an optical system for beam shaping of a laser beam for processing a material, which is in particular for the laser beam to a large extent transparent, by modifying the material in a focus zone, which is elongated in a propagation direction, includes, a diffractive optical beam shaping element for imposing one or more phase distributions on the laser beam that are in particular essentially rotationally symmetric around the beam axis. The optical system further includes a near field optics, which is arranged downstream of the diffractive optical beam shaping element at a beam shaping distance and is configured to focus the laser beam into the focus zone. At least one imposed phase distribution is such that a virtual optical image of an elongated focus zone is attributed to the laser beam, the virtual optical image being located upstream of the diffractive optical beam shaping element, or a real optical image of an elongated focus zone is attributed to the laser beam, the real optical image being located after the diffractive optical beam shaping element. The beam shaping distance corresponds to a propagation length of the laser beam, within which the plurality of beam shaping phase distributions transforms the transverse input intensity profile into a transverse output intensity profile in the region of the near field optics, and in particular the transverse output intensity profile has, in comparison with the input intensity profile, at least one local maximum lying outside of a beam axis.

Herein, concepts are disclosed that allow to at least partly improve aspects of the prior art. In particular, additional features and their functionalisms result from the following description of embodiments on the basis of the drawings. The drawings show:

DESCRIPTION OF DRAWINGS

FIG. 22A, FIG. 22B, FIG. 22C, FIG. 23A, FIG. 23B, FIG. 23C to FIG. 23D are schematic illustrations for asymmetric beam shaping by introducing a beam aperture.

DETAILED DESCRIPTION

Figure 1:
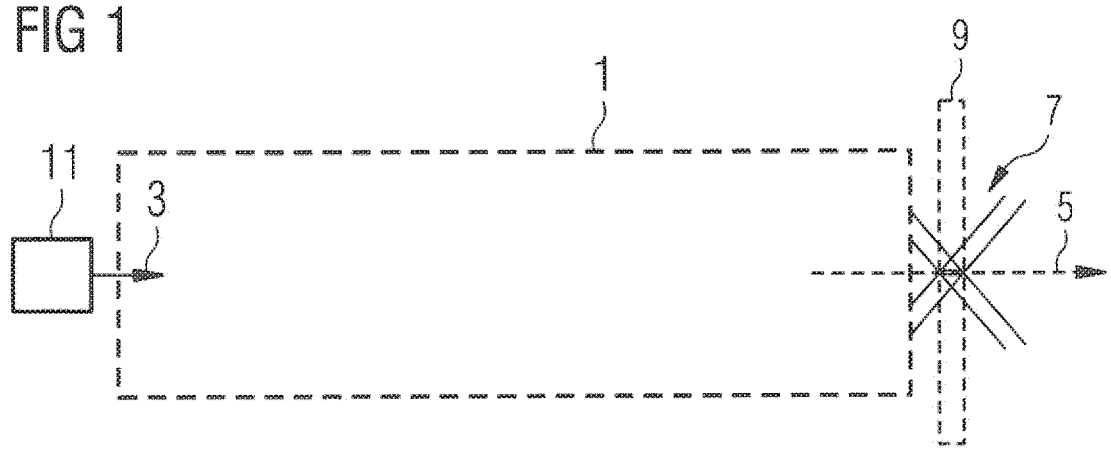
FIG. 1 is a schematic illustration of an optical system for beam shaping of a laser beam.

Aspects described herein are based partly on the realization that, due to the high intensities needed for laser processing, intensities may be present already during the preparation of the laser beam that result in damage of optical elements. In view thereof, it was further realized that the generation of an elongated focus zone within the work-piece may be based on the imaging of a virtual beam profile. By this concept of imaging a virtual beam profile, regions with intensity peaks can be reduced or even avoided in the optical system. It was further realized that a phase distribution attributed to the virtual beam profile may be imposed onto the laser beam that causes the desired change of the intensity distribution in the far field. In particular, it was realized that by a far field distribution, which originates from such a virtual beam profile, for example, inverse-Bessel beam-like or inverse quasi-Airy beam-like intensity distributions, specifically designed intensity distributions, and in particular superpositions of the same in the focus zone can be created. For such intensity distributions, a lateral energy entry into the focus zone can take place, which in particular enables the processing of transparent materials. It was further realized that, in comparison to systems for imaging a real intensity enhancement, the concept of the imaging of a virtual beam profile may lead to shorter configurations of such optical systems.

An elongated focus zone relates herein to a three-dimensional intensity distribution defined by the optical system that determines the spatial extent of the interaction and thereby the modification within the to be processed material. The elongated focus zone determines thereby an elongated region in which a fluence/intensity is present within the to be processed material, which is beyond the threshold fluence/intensity being relevant for the processing/modification. Usually, one refers to elongated focus zones if the three-dimensional intensity distribution with respect to a target threshold intensity is characterized by an aspect ratio (extent in propagation direction in relation to the lateral extent) of at least 10:1, for example 20:1 and more, or 30:1 and more. Such an elongated focus zone can result in a modification of the material with a similar aspect ratio. In some embodiments, focus zones can be formed that are, for example, also in propagation direction parallel with respect to each other, wherein each of the focus zones has a respective aspect ratio. In general, for such aspect ratios, a maximal change of the lateral extent of the (effective) intensity distribution over the focus zone can be in the range of 50% and less, for example 20% and less, for example in the range of 10% and less.

Thereby, the energy within an elongated focus zone can be laterally supplied essentially over the complete length of the created modification. As a consequence, a modification of the material in the initial region of the modification does not have or hardly has any shielding effects on the part of the laser beam that causes a modification of the material downstream of the beam, i.e., for example, in the end region of the modification zone. In that sense, a Gaussian beam cannot generate a comparable elongated focus because the energy supply is performed essentially longitudinally and not laterally.

The transparency of a material, which is essentially transparent for a laser beam, relates herein to the linear absorption. For light below the threshold fluence/intensity, material, which is essentially transparent for a laser beam, may absorb, for example, along a length up to the back end of the modification, e.g., less than 20% or even less than 10% of the incident light.

Aspects described herein further are partly based on the realization that by a desired beam shaping, for example, with a diffractive optical element (DOE), the density of free electrons, which is created in the material by nonlinear absorption, may be tailored. Along the thereby created modifications, a crack formation may be specifically guided, which then results in the separation of the work-piece.

Aspects described herein further are based partly on the realization that, for a DOE, multiple phase distributions can be provided in the phase distribution of a phase mask, for example, in respective segments. Thereby, in particular the advantages of the concept of a virtual optical image, for example, an inverse quasi-Bessel beam (e.g., inverse quasi-Bessel like beam) shape, can be used at the superposition of the imaging of multiple such virtual images (in longitudinal or lateral direction), wherein also the interaction (e.g., interference) and spatial constellation of multiple imaging may have effects onto the formation of the common focus zone. In addition, it was recognized that in this manner asymmetric "common" focus zones can be created. For example, for material processing, asymmetric "common" focus zones create a preference for a specific movement direction or a specific separation direction. Moreover, it was recognized that, during the laser processing, such preferred directions may be adopted to desired processing trajectories by orienting/turning the DOE within an optical system. For digital phase masks (SLMs etc.), a direct controlling of the phase distribution may further be performed to adapt the preferred direction.

Aspects described herein further are based in part on the realization that, by the use of a DOE, additional phase distributions may be imposed onto the beam, which, for example, may simplify the setup of the underlying optical systems and/or the isolation of a usable beam portion.

In other words, disadvantages of the prior art may in some embodiments at least partly be overcome by an optic concept, in which the beam profile, which is positioned in the region of the work-piece and which is elongated in propagation direction, is affected by an imaging of a created virtual beam profile. In some embodiments, the optic concept further allows a filtering possibility for undesired beam portions, for example, in a region of the Fourier-plane of the beam profile and a separation of the beam shaping from the focusing.

The systems and methods resulting from these realizations can inter alia enable separating of transparent, brittle-hard materials with high velocity and with good quality of the cutting edge. Moreover, such systems and methods may further enable separating without a taper angle as it is created in ablating methods. In particular, when separating based on non-ablating modifications, there may be no or only a small removal, with the consequence that the material has only a few particles on the surface after the processing.

In the following, the underlying optical concept will be generally explained with reference to FIGS. 1 to 8. Then, exemplary embodiments of optical systems will be explained, which, on the one side, implement the optical system by conventional optics such as lenses and mirrors (see FIGS. 9 to 11) and, on the other side, by diffractive optical elements (see FIGS. 12 to 16). In connection with FIGS. 17 to 20, the combinability of the optical system with components and aspects for filtering and scanning as well as general aspects of the beam development within the optical system are explained.

Figure 21A:
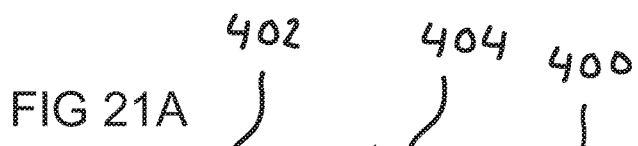
FIG. 21A, FIG. 21B and FIG. 21C are schematic illustrations for explaining potential causes for crack formation.
Figure 21B:
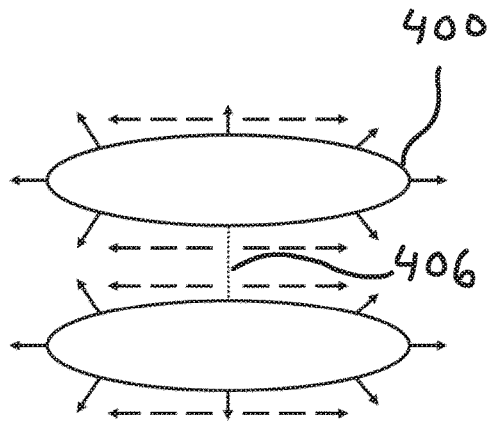
Figure 21C:
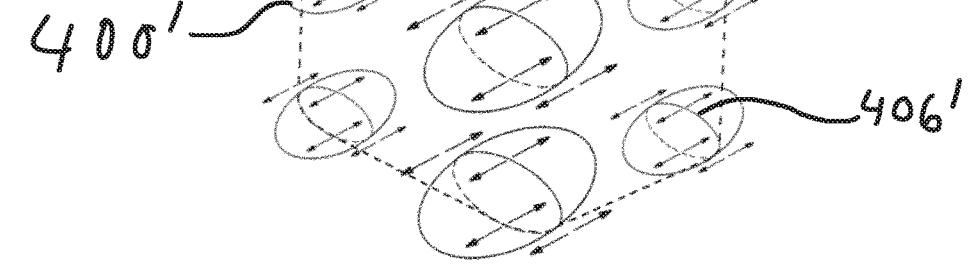

In connection with FIGS. 21A to 21C, potential causes are explained for formation of a preferred direction for a crack formation.

In the remaining figures, various concepts are proposed that relate to the interference of inverse quasi-Bessel beams in the formation of transverse asymmetries due to azimuthal segmentation (FIGS. 26 to 30) and transverse displaced phase distributions (FIGS. 31 to 36C).

FIG. 1 shows a schematic illustration of an optical system 1 for beam shaping a laser beam 3 with the aim to create a focus zone 7, which is elongated in a propagation direction 5, within a to be processed material 9. Generally, laser beam 3 is determined by beam parameters such as wavelength, spectral width, temporal pulse shape, formation of pulse groups, beam diameter, transverse input intensity profile, transverse input phase profile, input divergence, and/or polarization. According to FIG. 1, laser beam 3 is supplied to optical system 1 for beam shaping, i.e., for transforming one or more of the beam parameters. Usually, for laser material processing, laser beam 3 will be a collimated Gaussian beam with a transverse Gaussian intensity profile, which is generated by a laser beam source 11, for example an ultrashort pulse high-intensity laser system. The transformation can be performed, for example, into an inverse Bessel or inverse Airy beam shape.

Figure 2:
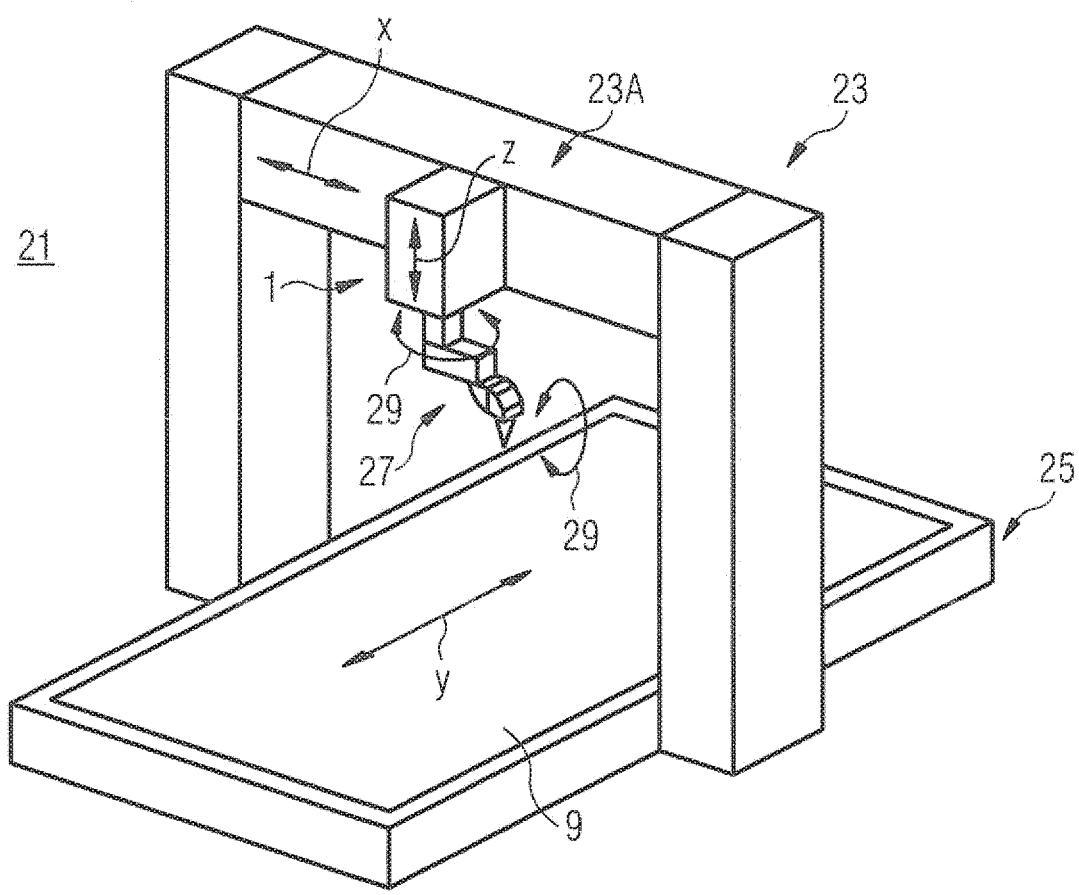
FIG. 2 is a schematic illustration of a laser processing device with an optical system according to FIG. 1 for material processing.

In the laser processing machine 21 shown in FIG. 2, optical system 1 may, for example, be used for material processing. Laser processing machine 21 includes a support system 23 and a work-piece positioning unit 25. Support system 23 spans over work-piece positioning unity 25 and carries laser system 11, which is integrated in FIG. 2, for example, in an upper crossbeam 23A of support system 23. In addition, optical system 1 is mounted at crossbeam 23A to be displaceable in X direction, so that both components are arranged close to each other. In alternative embodiments, laser system 11 may be provided, for example, as a separate external unit, laser beam 3 of which is guided to optical system 1 by optical fibers or as a free propagating beam.

Work-piece positioning unit 25 carries a work-piece that extends in the X-Y-plane. The work-piece is the to be processed material 9, for example, a glass plate or a plate in ceramic or crystalline embodiment such as sapphire or silicon, that is essentially transparent for the laser wavelength used. Work-piece positioning unit 25 allows displacing the work-piece in Y direction relative to support system 23, so that, in combination with the displaceability of optical system 1, a processing area is provided, which extends within the X-Y-plane.

According to FIG. 2, in addition, a relocatability is provided of e.g., optical system 1 or cross-beam 23A in Z direction, such that the distance to the work-piece can be set. For a cut running in Z direction, the laser beam is usually also directed in the Z direction (i.e., normal) onto the work-piece. However, additional processing axes may be provided as exemplarily illustrated in FIG. 2 by the boom arrangement 27 and the additional rotational axes 29. Accordingly, boom arrangement 27 is optional in the embodiment of FIG. 2. In addition, redundant add-on axes may be provided for higher dynamics, as, for example, not the work-piece or the optical system, but more compact and respectively designed components are accelerated.

Laser processing machine 21 further includes a control unit not explicitly shown in FIG. 1, which is, for example, integrated within support system 23 and which in particular includes an interface for inputting operation parameters by a user. In general, the control unit includes elements for controlling electrical, mechanical, or optical components of laser processing machine 21, for example, by controlling respective operation parameters such as pump laser power, cooling power, direction and velocity of the laser machine and/or the work-piece positioning unit, electrical parameters for setting an optical element (for example, of an SLM) and the spatial orientation of an optical element (for example, for rotation of the same).

Additional arrangements for laser processing machines with various degrees of freedom are disclosed, for example, in EP 1 688 807 A1, the entire contents of which are incorporated by reference. In general, for smaller work-pieces often only the work-piece is moved, and for larger work-pieces only the laser beam or—as in FIG. 2—the work-piece and the laser beam are moved. Moreover, two or more optical systems and, thus, focus zones may be supplied by a single laser system 11.

The modifications within the material, which are generated by the laser processing machine, may be used, for example, for drilling, separating by induced tensions, welding, creating a modification of the refraction behavior, or for selective laser etching. Accordingly, it is important to control the geometry as well as the type of modification in a suitable manner. Besides parameters such as laser wavelength, temporal pulse shape, number of pulses, energy and temporal distance of the pulses within a pulse group creating an individual modification, as well as pulse energy or pulse group energy, the beam shape plays a decisive role.

In particular, an elongated volume modification allows processing of a, in beam propagation direction long extending, volume region within a single processing step. In particular, at one position in feed direction, the processing can take place over a large extent in only a single modification processing step. By the use of the optical systems described herein, beam shapes, and methods, one can achieve, on the one side, better work results (in comparison to single modifications that are positioned next to each other at one position in feed direction in succeeding modification processing steps) and, on the other side, one can reduce the processing time and the requirements for the system technology. Then, for single modifications, multiple working steps are needed that increase the time needed and that require a more involved ensuring of relative positions of the single modifications.

In addition, an elongated focus zone can be helpful when processing uneven materials, because essentially identical laser processing conditions are given along the elongated focus zone such that, in those embodiments, a respective readjusting in propagation direction may not be necessary or only be necessary starting at a larger deviation of the position of the to be processed material than the lengths of the elongated focus area (in consideration of the required processing/intrusion depth).

In general, it applies to the processing of transparent materials by elongated volume absorption that, as soon as absorption takes place, that absorption itself or the resulting changes in the material properties can influence the propagation of the laser beam. Therefore, it is advantageous, if beam portions, which should cause a modification deeper within the work-piece, i.e., in beam propagation direction downward, essentially propagate not through regions of considerable absorption.

In other words, it is favorable to lead those beam portions, which contribute to the modification further downward, under an angle to the interaction zone. An example for this is the quasi-Bessel beam, for which a ring-shaped far-field distribution is given, the ring width of which is typically small in comparison to the radius. Thereby, the beam portions of the interaction zone are led in essentially with that angle in rotational symmetry. The same applies for the inverse quasi-Bessel beam described herein or for modifications or extensions of the same such as the homogenized or modulated inverse quasi-Bessel beam. Another example is the inverse accelerated "quasi-Airy beam-like" beam, for which the beam portions are led into the modification under an offset angle, where this is done clearly tangential and—not as for the pure quasi-Bessel beam rotationally symmetric—to the curved modification zone, e.g., as for a curved inverse quasi-Bessel beam.

Moreover, it is desired to considerably pass the threshold for the nonlinear absorption only within the desired volume region and to choose the geometry of that volume area such that it is suitable for the desired application, but that also the propagation to further downstream positioned volume regions is not significantly disturbed. For example, it may be advantageous to keep secondary maxima of an apodized Bessel beam profile below a threshold intensity needed for nonlinear absorption.

In view of modifications being subsequent in the feed direction, the geometry of the modified volume may further be selected such that, for a row of multiple modifications in the feed direction, an earlier induced modification has only an insignificant influence on the formation of the following modifications.

As already mentioned, for fast processing, the generation of a single modification can be performed with only a single laser pulse/a single laser pulse group, so that a position on a work-piece is approached only once in this case.

Ultrashort pulse lasers can make intensities (power densities) available that allow causing a sufficiently strong material modification in respective long interaction zones. The geometric extent of the modification is thereby set with the help of beam shaping such that a long extending, high density of free electrons is created by nonlinear absorption in the material. The supply of energy in deeper regions is performed laterally, so that the shielding effect by an upstream interaction of the plasma can be avoided in comparison to a Gaussian focusing. For example, an electron density, which extends smoothly in longitudinal direction, or an electron density, which is modulated spatially with a high frequency, can be generated.

At the respective intensities, within regions with a sufficiently high density of free electrons, an explosive expansion of the material may be caused, whereby the thereby resulting shock-wave can create nanoscopic holes (nano-voids). Additional examples for modifications (modification zones) are changes in the refractive index, compressed and/or tensile stress induced regions, micro-crystallites, and local changes in stoichiometry.

As explained in the beginning, by the accumulation of such modification zones in feed direction, a course of a crack can be set. During processing, the work-piece is accordingly separated along a respective modified contour. The crack formation can then occur directly thereafter or can be induced by another process. For example, for the separation of non-pre-strained materials ultrasound ramps, or temperature ramps may be used in order to cause a later separation along the modified contour. A single modification usually does not lead to crack formation.

With the help of a tailored beam shape, various tension distributions within the material and between the modified regions can be created in order to adapt the separation process to a given material. In the process, strong spatial and temporal gradients can favor the formation of a micro- or nano-explosion.

The modification geometry is thereby primarily determined by the beam shaping (and not by the nonlinear propagation as, for example, the filamentation). The generation of spatial gradients can be achieved by the optical systems described herein, while the generation of the temporal gradients can be achieved by pulse trains or pulse shaping.

Generally, a scaling of the intensity distribution of a beam shape can be achieved by the imaging ratio of the system, in particular by the focal length and the numerical aperture of the near field optics of the imaging system. Additional possibilities for scaling result from the use of an additional lens as well as the shifting of the beam shaping element and/or the far field optics (see the description in connection with FIGS. 17 and 22). Thus, the lateral and longitudinal extent of the beam profile within the work-piece can be influenced. In addition, spatial filters and apertures may be used within the beam path for beam shaping, in order to prepare the beam.

Exemplary laser beam parameters for, for example, ultrashort pulse laser systems and parameters of the optical system and the elongated focal zone, which can be applied within the range of this disclosure, are:

pulse energy Ep: 1 µJ to 10 mJ (e.g., 20 µJ to 1000 µJ), energy of a pulse group Eg: 1 µJ to 10 mJ ranges of wavelength: IR, VIS, UV (e.g., 2 µm>$\lambda$>200 nm; e.g., 1550 nm, 1064 nm, 1030 nm, 515 nm, 343 nm)

pulse duration (FWHM): 10 fs to 50 ns (e.g., 200 fs to 20 ns)

interaction duration (depending on the feed velocity): smaller 100 ns (e.g., 5 ps-15 ns)

duty cycle (interaction duration to repetition time of the laser pulse/the pulse group): less than or equal to 5%, e.g., less than or equal to 1% raw beam diameter D (1/e2) when entering the optical system: e.g., in the range from 1 mm to 25 mm focal lengths of the near field optics: 3 mm to 100 mm (e.g., 10 mm to 20 mm)

numerical aperture NA of the near field optics: 0.15≤NA≤0.5 length of beam profile within the material: larger 20 µm maximal lateral extent of the beam profile within the material, where applicable in the short direction: smaller 20$\lambda$ aspect ratio: larger 20 modulation in propagation direction: larger 10 periods over the focus zone feed dv between two neighboring modifications e.g., for separating applications:

100 nm<dv<10*lateral extent in feed direction feed during interaction duration: e.g., smaller 5% of the lateral extent in feed direction Thus, the pulse duration of the laser pulse and the interaction duration relate to a temporal range, within which, for example, a group of laser pulses interacts with the material for the formation of a single modification at a location. Thereby, the interaction duration is short regarding the present feed velocity, so that all laser pulses of a group contribute to a modification at one position.

If the work-piece is thinner than the focus zone is long, the focus zone is positioned partially outside of the work-piece, so that modifications may be caused that are shorter than the focus zone. Such a situation may be advantageously used to make the processing process robust also with respect to varying the distance between the optics and the work-piece. In some embodiments, a modification may be advantageous that does not reach through the complete work-piece. In particular, the length of the focus zone and/or its position within the work-piece may be adapted. In general it is noted, that, due to different thresholds for the nonlinear absorption, a focus zone with assumed identical intensity may cause differently large modifications in differing materials.

The aspect ratio relates to the geometry of the beam profile (the focus zone) within the to be processed material as well as the geometry of the modification created with a beam profile. For asymmetric or in lateral direction modulated (for example, non-rotationally symmetric or ring-shaped) beam profiles, the aspect ratio is given by the ratio of the length of the modification with respect to a maximum lateral extent in the shortest direction that is present within that range of length. If the beam profile thereby includes a modulation in lateral direction, for example, for ring-shaped beam profiles, then the aspect ratio relates to the width of a maximum, for a ring-shaped beam profile, for example, to the strength of the ring. When a plurality of modification volumes, which are displaced in lateral direction, are formed, the aspect ratio relates to the lateral extent of a single modification. For a beam profile modulated in propagation direction (e.g., due to interferences), the aspect ratio relates to the higher ranking total length.

Assuming a distance d between the beam shaping element and the focusing lens (near field optics), which is in particular larger than the focal length fN of the near field optics, and an NA of the near field optics with respect to air>0.15, the used angular spectrum α of the beam shaping element can be in the range $\tan(\alpha) < f^*NA/d < NA/2$ and preferably $\tan(\alpha) > f^*NA/(d^*4)$.

The previously mentioned ranges for parameters may allow the processing of a material thickness up to, for example, 5 mm and more (typically 100 µm to 1.1 mm) with roughness of the cutting-edge Ra, for example, smaller than 1 µm.

Optical system 1 may further include a beam processing unit 13 for adapting beam parameters such as beam diameter, input intensity profile, input divergence, and/or polarization of laser beam 3. For example, the laser beam of a pulsed laser system is coupled into optical system 1 with, for example, a beam diameter of 5 mm, pulse duration of 6 ps at wavelengths around 1030 nm and is led to processing unit 13.

Figure 3:
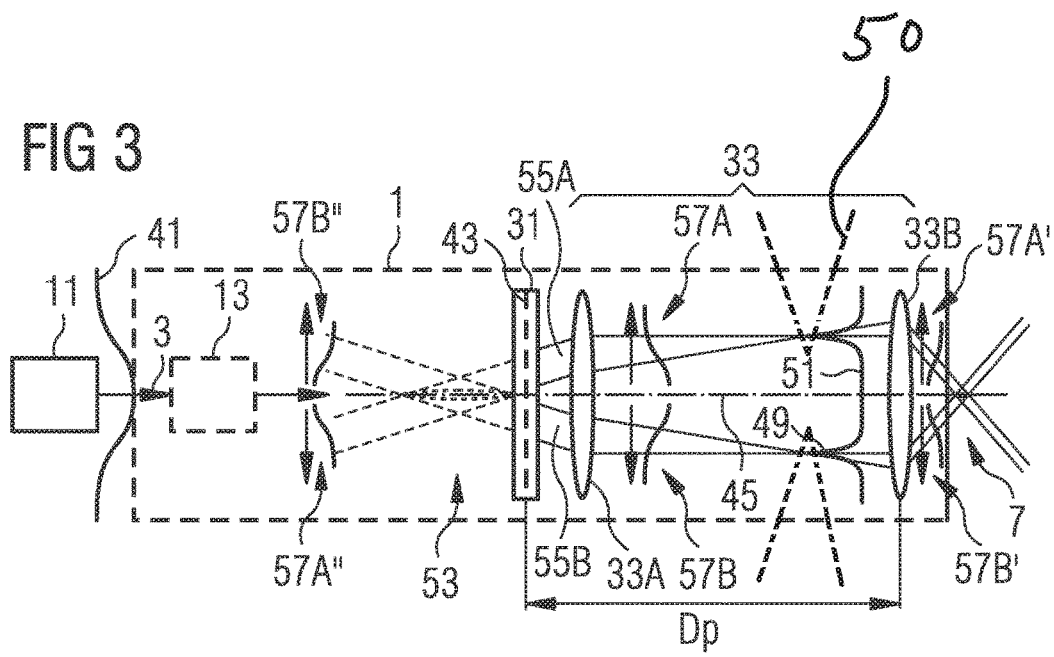
FIG. 3 is a schematic illustration of an optical system for explaining the optical functioning.

FIG. 3 shows the schematic setup of optical system 1 for explaining the functionality. Optical system 1 is based on a beam shaping element 31 and an imaging system 33. Beam shaping element 31 is adapted to receive laser beam 3. Accordingly, it is adapted to a transverse input intensity profile 41 of laser beam 3. In addition, beam shaping element 31 is adapted to impose onto laser beam 3 a beam shaping phase distribution 43 (schematically indicated by dashes in FIG. 1) over transverse input intensity profile 41. Imposed phase distribution 43 is such that a virtual optical image 53 (essentially) of elongated focus zone 7 is attributed to laser beam 53, virtual optical image 53 being located in front of beam shaping element 31. Beam shaping element 31 creates in this manner a virtual beam profile that is located upstream of beam shaping element 31, but does not correspond to the real path of the beam being at that position.

Imaging system 33 is construed such that the virtual beam profile is imaged into the area of the laser processing machine, in which the work-piece is positioned during the processing. In FIG. 3, imaging system 33 includes for that purpose an, in beam direction, first focusing element, which is referred to herein as far field optics 33A, and an, in direction of the beam, second focusing element, which is referred to herein as near field optics 33B.

Far field optics 33A is provided in the area of phase imposing and is illustrated in FIG. 3 exemplarily downwards of beam shaping element 31 by a lens shape. As will be explained in the following, far field optics 33A may also be arranged shortly before beam shaping element 31, composed of components before and after the beam shaping element, and/or completely or partially integrated in the same.

After the imposing of the phase within beam shaping element 31, laser beam 3 propagates in accordance with imaging system 33 over a beam shaping distance Dp to near field optics 33B. Beam shaping distance Dp corresponds thereby to a propagation length of the laser beam 3, within which imposed phase distribution 43 transforms the transverse input intensity profile 41 into a transverse output intensity profile 51 at near field optics 33B. Herein, output intensity profile 51 includes those transverse intensity profiles in the optical system that are determined by the phase imposing. This is usually completed at the latest in the area of the focal length before the near field optics or within the area of the near field optics.

For implementing the concept of a virtual beam profile, there are the following considerations for the propagation length (from beam shaping element 31 to near field optics 33B), which laser beam 3 has to propagate within the optical system. In general, the optical system forms an imaging system 33 with a far field focusing action and a near field focusing action. The latter is determined by near field optics 33B and thereby by near field focal length fN. The first is determined by a far field focusing action and a respective far field focal length fF. Far field focal length fF can be realized by the separate far field optics 33A and/or can be integrated into the beam shaping element. See in this respect also FIG. 20. Imaging system 33 has an imaging ratio of X to 1, whereby X for a demagnification of the virtual image usually is larger than 1. For example, imaging ratios are implemented that are larger than or equal to 1:1 such as larger than or equal to 5:1, 10:1, 20:1, or 40:1. In other words, with this definition of the imaging, the factor X resembles the magnification of the lateral size of the focus zone into the virtual profile. The angle is respectively demagnified. Attention should be paid to the fact that the imaging ratio goes quadratic into the length of the profile. Accordingly, the longitudinal length of a virtual image becomes smaller, for example, for an imaging ratio of 10:1 by a factor of 100 and for an imaging ratio of 20:1 by a factor of 400.

At an imaging ratio of 1:1, there is fN=fF, an overlapping alignment of the focal planes is assumed. In general, there is fF=X fN. If the far field optics 33A is integrated into the beam shaping element, it is positioned, e.g., at a distance fN+fF from the near field optics, i.e., typically in the range of the sum of the focal lengths of both optical elements. For a 1:1 or a de-magnifying imaging system, the propagation length corresponds therefore at least to twice the focal length of the near field optics.

Separating far field optics 33A and beam shaping element 31 and assuming, that the virtual optical image should not overlap (in particular not within the intensity region being relevant for the focus zone) with the beam shaping element, the beam shaping element is arranged at at least at a distance of I/2 downward of the longitudinal center of virtual beam profile 53. Here, the length I is the longitudinal extent of virtual beam profile 53 with respect to the relevant intensity area. The longitudinal center of virtual beam profile 53 is located e.g., at the entrance side focal plane of far field optics 33A, which is located at a distance fN+fF from near field optics 33B. In this case, the propagation length is d=fN+2fF−I/2=(1+2X) fN−I/2, therefore smaller than fN+2fF=(1+2X) fN, or, in other words, smaller than the distance between the optical elements plus fF.

For the distance fN+2fF=(1+2X) fN, also for increasing beam enlargements a respectively increasing length I of virtual beam profile 53 can be imaged, whereby—as explained later—a defined end of the profile can be maintained.

In general it is mentioned that, due to raw beam divergences and convergences as well as for deviating adjustment of the imaging system, deviations from the above considerations may occur. In contrast to a comparable image of a real intensity enhancement, i.e., images with comparable imaging ratios, the beam shaping element is located closer (see the respective discussion on FIGS. 7 and 8). A common distance therefore lies in a range (1+2X) fN≥d≥2fN.

Due to the imposed phase, transverse output intensity profile 51 includes, in comparison to input intensity profile 41, at least one local maximum 49 located outside of a beam axis 45. Local maximum 49 being located outside beam axis 45 results in a lateral energy entry into focus zone 7. Depending on beam shaping element 31, local maximum 49 of transverse output intensity profile 51 can be made rotationally symmetric with respect to beam axis 45—as indicated in FIG. 3 in the cut view—or it can be formed in an azimuthal angular range (see, e.g., FIGS. 29 and 30). Usually, the beam axis is defined by the center of the beam of the lateral beam profile. The optical system can usually be related to an optical axis, which usually runs through a symmetry point of the beam shaping element (e.g., through the center of the DOE or the tip of the reflective hollow cone axicon). For rotationally symmetric beams and a respective exact alignment, the beam axis may coincide with the optical axis of the optical system at least in sections.

The local maximum can be considered a generic feature of output intensity profile 51, where in particular for inverse quasi-Bessel beam shapes, a typical substructure with a steep and slowly falling flank can be formed. That substructure can invert itself due to the focusing action of the beam forming element and/or the far field optics in the range of an associated far field focal plane. In particular, the output intensity profile can show within the range of that far field focal plane the local maximum particularly "sharp" or, for example, for inverse quasi-Bessel beam shapes, the local maximum can form itself quite fast after the beam forming element. However, the aspects of the substructure may vary due to the various possibilities in the phase imposing.

The concept of a virtual beam profile can, on the one side, reduce the constructional length of optical system 1 and, on the other side, it can avoid the formation of an elongated beam profile with significant intensity enhancement within optical system 1. Imaging system 33 is configured such that, within optical system 1, the far field of the virtual beam profile is formed and that the focusing in the near field optics 33B can be done using a common focusing component such as a lens, a mirror, a microscopic objective, or a combination thereof. In that case, "common" is understood herein in the sense of that the characteristic beam shape is essentially imposed by beam shaping element 31 and not by near field optics 33B.

In FIG. 3, a path of the beam is indicated for illustration that corresponds to a beam herein referred to as an inverse quasi-Bessel beam. For that purpose, the path of the beam is illustrated downstream of beam shaping element 31 with solid lines. Upstream of beam shaping element 31, instead of incident collimated beam 3, the virtual beam profile is sketched in analogy to a real quasi-Bessel beam by dashed lines.

Similar to a common quasi-Bessel beam, also the inverse quasi-Bessel beam has a ring structure in the focal plane of far field optics 33A. However, divergent beam areas 55A, 55B indicated in the schematic cut view, which impinge on far field optics 33A, do not result from a "real" quasi-Bessel beam profile, but they result directly from the interaction of beam shaping element 31 with incident laser beam 3. Due to the direct interaction, beam areas 55A, 55B are shaped in their lateral intensity distribution by transverse beam profile 41 of laser beam 3. Accordingly, for a Gaussian input beam, the intensity decreases in the radial direction principally in beam areas 55A, 55B from the inside to the outside. Due to the divergence of beam areas 55A, 55B, typically an area of low (in the ideal case no) intensity is formed accordingly on the beam axis for the phase-modulated beam portions. In that case, the divergence of a beam portion, accordingly also a divergent beam portion, relates herein to a beam portion that moves away from the beam axis. However, in that area, a beam portion of a phase unmodulated beam and/or also an additional, phase-modulated beam portion may be superimposed. With respect to the development of the beam within the optical system during the shaping of an inverse Bessel beam, it is referred to the description of FIGS. 33 and 34. This intensity behavior is schematically indicated in transverse intensity courses (e.g., transverse intensity beam profile segments) 57A and 57B. It is noted that the intensity courses along the propagation length can change due to imposed phase distribution 43. At least, however, within the initial area (i.e., beam areas 55A, 55B laying close to beam shaping element 31) and due to the beam shaping element 31 acting in general as a pure phase mask, the incident intensity profile of laser beam 3 dominates the divergent phase-modulated beam portions.

For a clear explanation of an inverse quasi-Bessel beam, further intensity courses 57A' and 57B' are schematically indicated in FIG. 3. Here, it is assumed that beam shaping element 31 influences only the phase and not the amplitude. One recognizes that the focusing by far field optics 33A (or the respective far field action of beam shaping element 31) reverses the intensity course at the exit of optical system 1 such that, during the formation of elongated focus zone 7 on beam axis 45, at first low intensities are superposed, which originate from the decreasing flanks of the incident Gaussian beam profile. Thereafter, the higher intensities super-pose, which originate from the central area of the incident Gaussian beam profile. In this context it is noted that not only the intensity on the beam shaping element, but also the contributing area has to be acknowledged. For rotationally symmetry, the distance enters accordingly quadratic. As in particular illustrated in connection with FIG. 4, the longitudinal intensity profile ends exactly in that area, in which the beam portions from the center of the input profile cross. In the center, although the highest intensity is present, the area goes to zero. Moreover, it is noted that, after the focus zone, a reversed intensity course is present again, which corresponds to intensity courses 57A, 57B after the beam shaping element (assuming no interaction with a material).

Due to imaging with imaging system 33, there are incident virtual intensity courses 57A″ and 57B″, which are accordingly schematically indicated with respect to the virtual beam shaping in FIG. 3. Those correspond in principle to intensity courses 57A′ and 57B′.

Those intensity courses, which are inverted in comparison to a quasi-Bessel beam, cause a specific longitudinal intensity course for the inverse quasi-Bessel beam for focus zone 7 as well as in the virtual beam profile, i.e., optical image 53, because here the superposition of beam portions 55A, 55B is done virtually. For the respective discussion of the intensity course for a conventional quasi-Bessel beam, it is referred to FIGS. 7 and 8 and the respective description.

Figure 4:
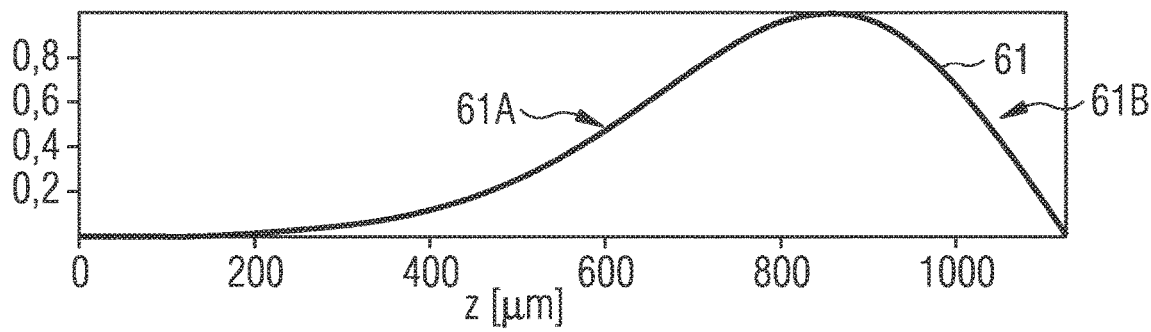
FIG. 4 is an example of a longitudinal intensity distribution in an elongated focus zone after imaging a virtual optical image.

FIG. 4 exemplarily illustrates a longitudinal intensity distribution 61 within elongated focus zone 7 as it can be calculated for the imaging of virtual optical image 53 of an inverse quasi-Bessel beam shape. Depicted is a normed intensity I in Z direction. It is noted that a propagation direction according to a normal incidence (in Z direction) onto material 9 is not required and, as illustrated in connection with FIG. 2, can take place alternatively under an angle with respect to the Z direction.

One recognizes in FIG. 4 an initially slow intensity increase 61A over several 100 micrometer (initial superposition of low (outer) intensities) up to an intensity maximum, followed by a strong intensity decrease 61B (superposition of the high (central) intensities). For an inverse Bessel beam shape, the result is therefore a hard border of the longitudinal intensity distribution in propagation direction (the Z direction in FIG. 4). As one can in particular recognize in view of intensity courses 57A′ and 57B′ shown in FIG. 3, the hard border is based on the fact that the end of longitudinal intensity distribution 61 relies on the contributions of the beam center of the incident laser beam having admittedly a lot of intensity, but on a strongly reduced (going to zero) area. In other words, the end relies on the imaging of a virtual beam profile in which in the center for the inverse quasi-Bessel beam a hole is created. The strong gradient at the intensity decrease at the end relies on the high intensity in the center of the input profile, limited, however, by the disappearing area. For an ideal imaging system, the longitudinal extent of intensity distribution 61 is defined by the position of the virtual profile and the imaging scale. If in addition the work-piece includes a large refractive index, the beam profile is accordingly lengthened.

In this context it is added that the hard border has the consequence in laser processing machines that the, in propagation direction, front end of a modification is essentially stationary in propagation direction also if the incident transverse beam profile is increased. The modification changes its extent only in the back part, i.e., it can lengthen in direction to the near field optics, if the input beam diameter of the laser beam enlarges. A once set position of the hard border with respect to the work-piece support or the work-piece itself can thereby avoid high intensities downstream of the modification. In contrast thereto, an enlargement of the input beam diameter, when imaging a real intensity enhancement, causes an elongation of the modification in propagation direction, i.e., for example into a work-piece support, which can result in damages of the same.

Figure 5:
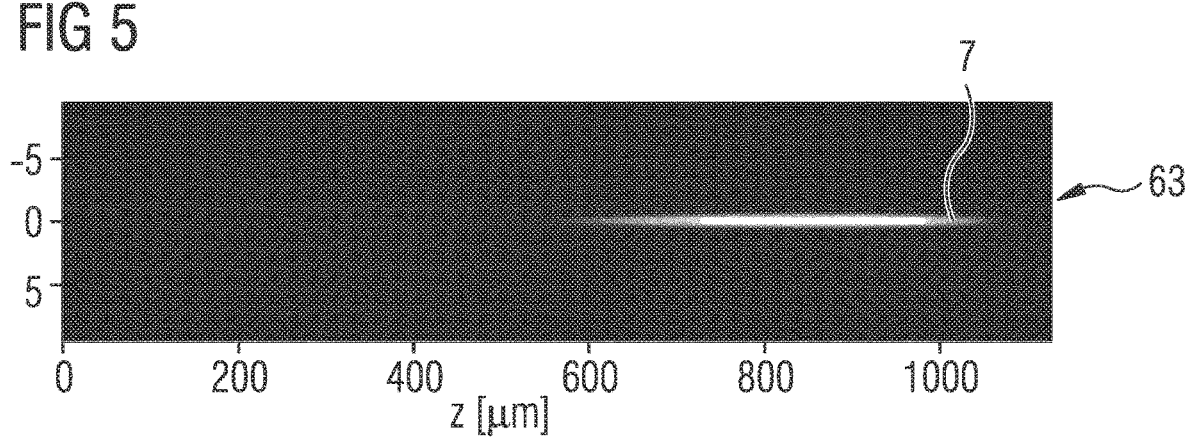
FIG. 5 is a ZR-section of the longitudinal intensity distribution shown in FIG. 4.

FIG. 5 shows an exemplary X-Y-cut 63 of the intensity within focus zone 7 for the longitudinal intensity distribution 61 shown in FIG. 4. One recognizes the elongated formation of focus zone 7 over several hundred micrometer at a transverse extent of some few micrometer. Together with the threshold behavior of the nonlinear absorption, such a beam profile can cause a clearly defined elongated modification within the work-piece. The elongated shape of focus zone 7 includes, for example, an aspect ratio, i.e., the ratio of the length of the focus zone to a maximal extent in the lateral shortest direction being present within that length—the latter for non-rotationally symmetric profiles, in the range from 10:1 to 1000:1, e.g., 20:1 or more, for example 50:1 to 400:1.

If one frees oneself from the beam shape—shown in FIG. 4—of an inverse quasi-Bessel beam, which is not modified in propagation direction with respect to amplitude, beam shaping element 31 can additionally create an amplitude redistribution in the far field, which e.g., can be used for an intensity modification in propagation direction. However, the thereby created intensity distribution in front of focus zone 7 can no longer be presented in a very clear manner. Nevertheless, often initial stages of inversions will show up in the beginning region or in the end region of the longitudinal intensity profile, for example a slow increase and a steep decrease. However, a (phase caused) amplitude redistribution by the phase description of beam shaping element 31 may just exactly be set to an inverted intensity distribution, in order to cause, for example, a form of a longitudinal flat top intensity profile.

Additionally, the following feature for distinguishing from a "real" beam shape may be maintained: For the case of a real Gaussian input beam, there exists, e.g., for a real Axicon, a plane between near field optics and focus zone at which the demagnified Gaussian transverse beam profile of the input beam is present and can accordingly be made visible. A respective imaging exists for the virtual optical image. However, in this case, the image plane, in which the demagnified Gaussian transverse beam profile is present, lies behind the focus zone. The transverse beam profile can accordingly be made visible. This applies generally to phase masks for the herein disclosed inverse beam shapes, if those are illuminated with a Gaussian beam profile. Specifically, the demagnified Gaussian transverse beam profile is positioned in the image plane of the beam shaping element and therefore usually directly downstream of the focus zone. Due to the already performed divergence, it is therefore significantly larger than the transverse beam profile of the inverse quasi-Bessel beam in the focus zone. Also, it is much lower in the intensity.

One can recognize the position of the imaged Gaussian transverse beam profile of the input beam by a fast turn up of the structure of the beam profile, i.e., a strong change over a small lateral area. For example, the transverse intensity profile of the inverse quasi-Bessel beam is present in the focus zone. When passing through the image plane of the beam shaping element, then "quasi" immediately the dark spot in the center is formed. For an inverse quasi-Bessel beam, this is different at the beginning of the focus zone. There, due to the increased superposition of the border areas of the Gaussian beam profile, a slow transition is made from a dark center to the transverse intensity profile of the inverse quasi-Bessel beam, which is filled in the center. In other words, in longitudinal direction, the intensity increases over a larger area then it decreases at the end. At the end, that transition is accordingly clearly sharply limited. It is added that, when imaging a real Bessel intensity enhancement, the behavior at the end and the behavior at the beginning are interchanged, i.e., at the end of the Bessel beam profile, the dark spot forms more slowly.

As previously explained, the concept of using a virtual beam profile therefore has an effect inter alia on the phase imposing to be applied and the resulting intensity courses in focus zone 7.

Figure 6:
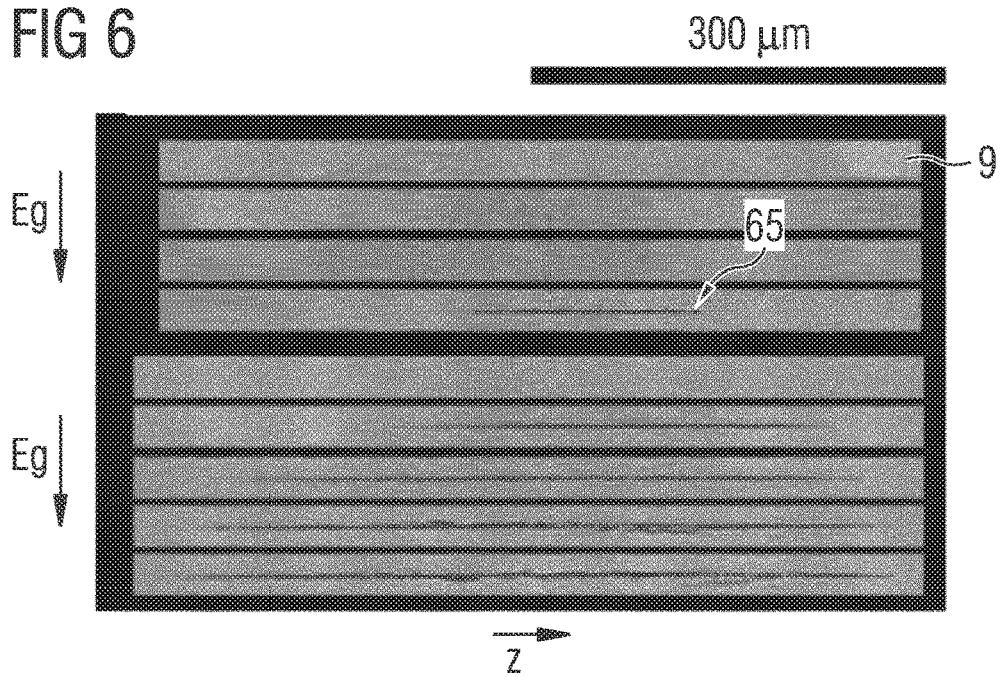
FIG. 6 is an exemplary experimental study on the modification of a transparent material in an elongated focus zone according to FIGS. 4 and 5.

FIG. 6 illustrates modification zones 65 that were created in the context of an experimental study for examining the formation of modifications in a transparent material. Each modification zone 65 goes back to the interaction with a group of laser pulses, for example two 6 ps pulses at a temporal separation of about 14 ns. The shape of the modification zones correspond to the shape of elongated focus zone 7 as assumed in accordance with FIGS. 4 and 5. The maximal length is limited by the geometry of elongated focus zone 7 at a required intensity/fluence.

The upper four images illustrate the threshold behavior for pulse group energies Eg from about 20 µJ to 40 µJ. The lower four images illustrate the shaping of the elongated modification zones 65 at pulse group energies Eg from about 30 µJ to 200 µJ. With increasing total energy Eg, the modification zone lengthens in the direction of the beam entrance (near field optics), because the threshold intensity for the nonlinear absorption is reached within a longer area of focus zone 7. The end of the modification in beam propagation direction is in its position essentially stationary, and even in particular without secondary correction of the distance of a near field optics (33B) to the to be processed work-piece. At lower energies, an initial walk in beam direction of the back end may occur due to the existing gradient in longitudinal direction, in particular if the modification threshold lies at small intensities within the beam profile. However, the walk decreases at medium and high energies, because the generation of the inverse quasi-Bessel beam profile includes in propagation direction an implicit maximal back end.

A similar behavior in the change of the longitudinal extent of the modification is also created for a radially increasing beam diameter of incident laser beam 3. Also in that case, the modification zone is lengthening in direction of the beam entrance (near field optics), because the intensity areas of incident laser beam 3, which are added in a radial direction at the outside, guide energy into the longitudinal intensity area in the area of slow intensity increase 61A (i.e., intensity increase with slow gradient). The maximum of the intensity distribution will accordingly be shifted in direction of the beam entrance. The end of the modification in beam propagation direction is in contrast in its position essentially stationary, because that position is supplied with energy by the center of the beam of incident laser beam 3. In addition it is noted that this behavior can be observed also for modified inverse quasi-Bessel beam shapes. For example, for a flat top beam shape as discussed in connection with FIGS. 23 to 26, the position of the end of the modification would essentially not change for a change in the beam diameter. For such a changed incident intensity profile, the beam shaping element may further eventually no longer result in an optimized flat top structure so that this may result in modulations in the intensity and eventually a variation of the beginning.

Figure 7:
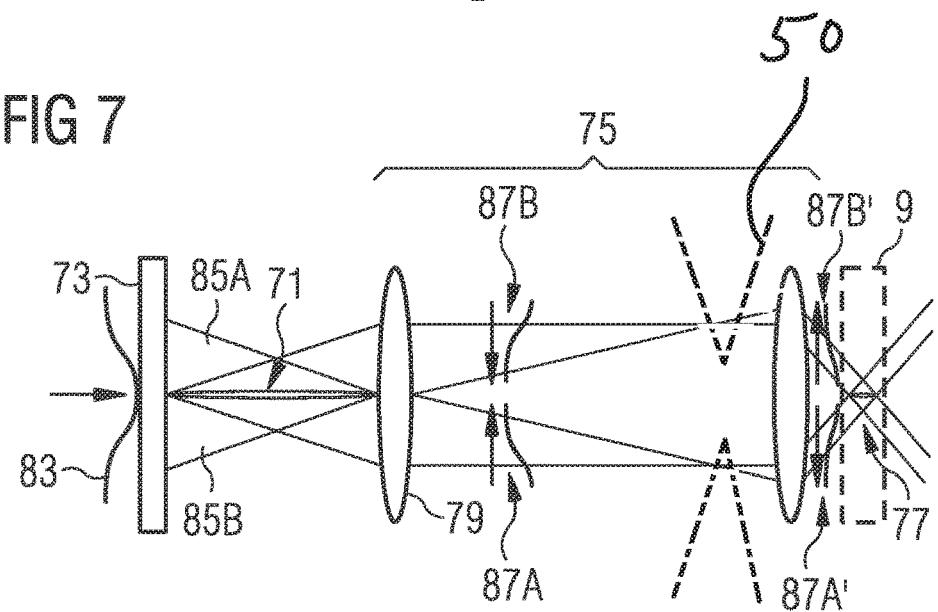
FIG. 7 is a schematic illustration for explaining the generation and imaging of a real intensity enhancement.

FIG. 7 serves as an illustration of a beam guidance at which a real intensity enhancement 71 is generated by a beam shaping optics 73 such as an axicon. This corresponds to the known formation of a quasi-Bessel beam. Intensity enhancement 71 is then imaged by a telescope 75 into work-piece 9 by forming a focus zone 77. As shown in FIG. 7, in such a setup, there is the danger that the real intensity enhancement 71 damages a far field optics 79 of telescope system 75, in particular if a small setup length is to be realized. The herein disclosed optical system (see, e.g., FIG. 3), which implements the concept of a virtual image, bypasses that risk of a damage to the beam guiding optics.

Figure 8:
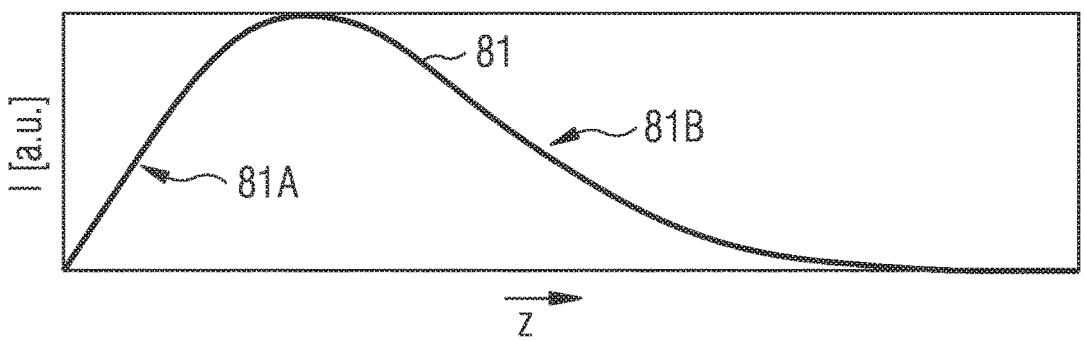
FIG. 8 is an example of a longitudinal intensity distribution in an elongated focus zone after imaging a real intensity enhancement according to FIG. 7.

FIG. 8 illustrates for completeness a longitudinal intensity distribution 81 in Z direction that results from the setup of FIG. 7. After an ab initio steep increase 81A, an intensity maximum is reached, beginning at which the intensity decreases again. At lower intensities, a slowly vanishing drop 81B (vanishing drop of small gradient) begins. One sees the general reversal of the longitudinal intensity distributions 61 and 68 of FIGS. 4 and 8, at which the "hard border" at the end is replaced by a "hard beginning".

For such a quasi-Bessel beam, the passing through an axicon with a laser beam having an incident Gaussian beam profile 83 will result in superposed beam portions 85A, 85B, the intensity weights of which result in real longitudinal intensity distribution 81 (at first superposition of the intensities of the central area of Gaussian beam profile 83, then superposition of lower (outer) intensities of Gaussian beam profile 83). For explaining, again schematic intensity courses 87A and 87B are indicated downstream of far field optics 79, and intensity courses 87A' and 87B' are indicated upstream of focus zone 77.

Before various exemplary configurations of optical systems, which implement the concept of virtual intensity enhancement, will be explained in the following, it is referred again to FIG. 3, and in particular transverse output intensity profile 51 at near field optics 33B. In the area of output intensity profile 51, one can influence, for example, with an aperture 50 the portions that contribute to the focus zone. Depending on the orientation and width of the aperture opening and in general the shape of the aperture, a modification of the longitudinal intensity distribution 61 can be caused in elongated focus zone 7 and can be even adapted. For a rotationally symmetric—as shown in FIGS. 3 and 7—output intensity profile 51 or for a respective symmetric phase distribution in FIG. 14, a rotation of the aperture around the beam axis can cause a rotation of the orientation of the modification in focus zone 7.

Such a mechanical control of an aperture 50 can e.g., be performed alternatively by a rotation of a previously addressed and in connection with the following figures further explained permanently written DOE or can be implemented electronically by time-dependent setting of a programmable DOE. Accordingly, the laser processing machines, which are intended for a respective laser cutting and in particular guiding, include rotation mechanics and/or electric control devices. As addressed above, here the output intensity or the optical element of an inverse as well as a regular quasi-Bessel beam can be modified or rotated.

This relates in particular to the systems explained in the following that include beam shaping elements in the transmission and reflection, wherein the imposing of the phase distribution is performed in particularly refractive, reflective, or diffractive. It is referred to the preceding description with respect to the already described components such as laser system 11.

Figure 9:
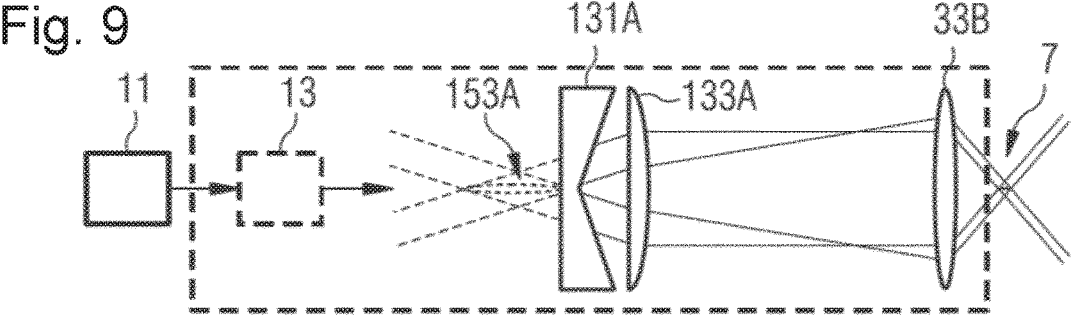
FIG. 9, FIG. 10 and FIG. 11 are schematic illustrations of examples for optical systems based on transmitting or reflective axicons.

In view of the distances of beam shaping optics 73 from the near field optics, the following values can apply similar to the considerations for the virtual image. For a real beam profile, one would typically position the center of the to be imaged real beam profile of length I in the entrance-side focal length of the far field optics. A typical distance would then be at least fN+2fF+I/2=(1+2X) fN+I/2, thus larger than fN+2fF, in other words, larger than the dis-tance between the optical elements plus FIG. 9 shows a refractive beam shaping with the help of a hollow cone axicon 131A. This creates a virtual inverse quasi-Bessel beam profile 153A upward of hollow cone axicon 131A. The same is indicated in FIG. 9 by dashed lines, a real intensity enhancement is not present in that area. In addition, in the embodiment of FIG. 9, the far field optics is configured in beam propagation direction downstream of hollow cone axicon 131A as plano-convex lens 133A. Near field optics 33B causes the focusing of the laser beam into focus zone 7, so that the virtual inverse quasi-Bessel beam profile 153A is related to the laser beam as virtual optical image of focus zone 7.

Figure 10:
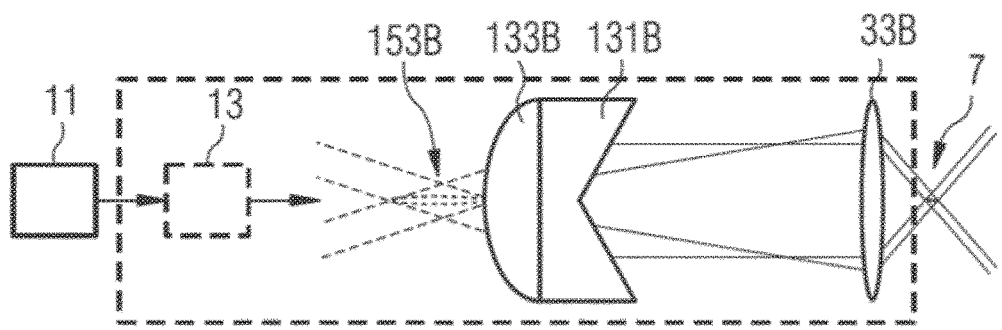

FIG. 10 shows an embodiment with a hollow cone axicon lens system 131B that is used as a refractive beam shaping element. Here, the far field optics is integrated in the beam shaping element as convex lens surface 133B, which is positioned at the entrance side of the hollow cone axicon. This setup creates similarly a virtual inverse quasi-Bessel beam profile 153B.

Figure 11:
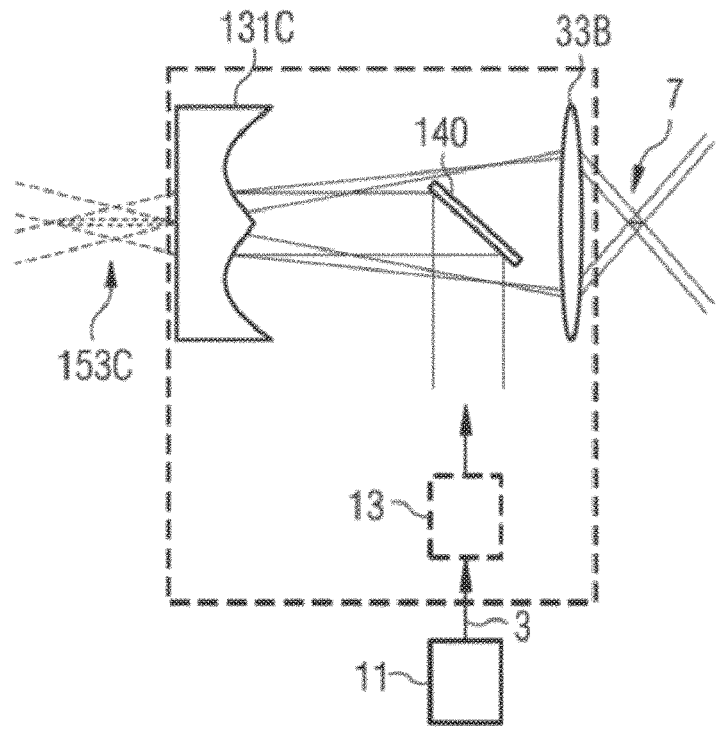

FIG. 11 illustrates an embodiment with a reflective beam shaping element, in particular a reflective axicon mirror system 131C. A highly reflective surface of the beam shaping element is shaped such that the beam shaping feature of a reflective axicon is combined with the far field forming component of a focusing hollow mirror. Accordingly, axicon mirror system 131C has the function of beam shaping as well as of the far field optics. A virtual inverse quasi-Bessel beam profile 153C is indicated at the backside of axicon mirror system 131C, thus in an area that is not passed by laser beam 3.

As is further shown in FIG. 11, after beam adaptation unit 13, laser beam 3 of laser system 11 is coupled into optical system 1 by a deflection mirror 140. Deflection mirror 140 is, for example, arranged on the optical axis between axicon mirror system 131C and near field optics 33B and guides the beam to beam shaping element 131C. In some embodiments, the deflection mirror may, for example, be centrally drilled through to guide as less as possible light onto the central area of beam shaping element 131C, which potentially has optical errors. In addition to those aspects of filtering described in the following in connection with FIGS. 17 and 18, it is already noted at this stage that deflection mirror 140 at the same time blocks an undesired central beam portion such that the same is not focused by near field optics 33B.

Figure 12:
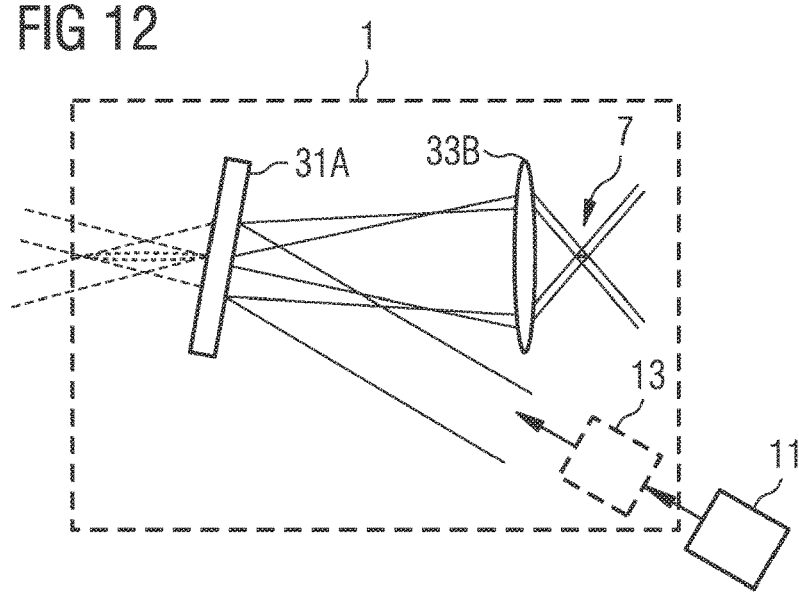
FIG. 12 is a schematic illustration of an example of an optical system based on a spatial light modulator.
Figure 13:
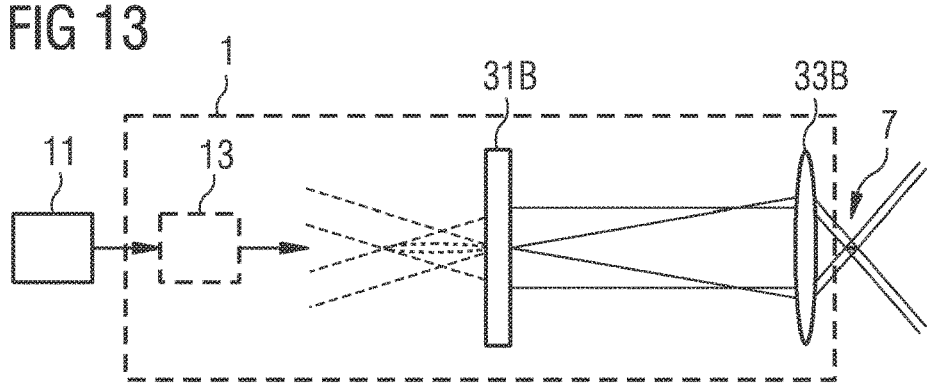
FIG. 13 is schematic illustration of an example of an optical system based on a transmitting diffractive optical element.

FIGS. 12 and 13 show embodiments of the optical system with digitalized beam shaping elements. Here, the digitalization can relate to the use of discrete values for the phase shift and/or the lateral structure (for example, pixel structure). The use of spatial light modulators (SLMs) is one of many different possibilities to realize the beam shaping with programmable or also permanently written diffractive optical elements (DOE).

In addition to the simple generation of one or more virtual beam profiles, e.g., according to the phase imposing of one or more hollow cone axicons, diffractive optical elements allow the desired modification, for example, for homogenizing of the longitudinal intensity distribution.

For this, deviations in the phase can exemplarily be used in the range equal to or smaller than 50%, e.g., equal to or smaller than 20% or equal to or smaller than 10% with respect to, for example, the hollow cone axicon phase (and thereby of an inverse quasi-Bessel beam). In general, SLMs allow very fine phase changes at a lateral rough resolution, in contrast to, for example, lithographically generated, permanently written DOEs. Permanently written DOEs include e.g., plano-parallel steps, the thickness of which determine the phase. So, the lithographic manufacturing allows a large lateral resolution. Binary steps can result in real and virtual beam profiles. Only a number of more than two phase steps can result in a differentiation in the sense of a preferred direction for the virtual beam profile. For example, four or eight or more phase steps allow an efficient beam shaping with respect to the virtual beam profile. However, the discretization can cause secondary orders that can, for example, be filtered out.

Herein, the structural element of a diffractive optical beam shaping element, which causes the phase imposing and is configured in an areal shape, be it an adjustable SLM or a permanently written DOE, is referred to as a phase mask. Depending on the type of configuration of the DOE, it may be used in transmission or in reflection to impose a phase distribution on a laser beam.

In FIG. 12, a spatial light modulator 31A is used in reflection for phase imposing. For example, spatial light modulator 31A is based on a "liquid crystal on silicon" (LCOS) that enables a phase shift that is programmable for the individual pixels. Spatial light modulators can further be based on micro-systems (MEMS), micro-opto-electro-mechanical systems (MOEMS), or micro-mirror-matrix systems. In SLMs, the pixels can, for example, be controlled electronically to cause a specific phase imposing over the transverse input intensity profile. The electronic controllability allows, for example, the online-setting of phases and, thus, the adaptation of focus zone 7, e.g., in dependence of the to be processed material or in reaction of fluctuations of the laser. In the configuration of FIG. 12, the function of a diffractive axicon for the generation of a virtual inverse quasi-Bessel beam profile can be combined, for example, with the far field forming action of a far field optics by the phase shifting of the spatial light modulator 31A. Alternatively, a permanently written reflective DOE can be used as beam shaping element 31A.

FIG. 13 is a schematic view of an optical system based on a DOE 31B, for which the phase imposing is permanently written in DOE 31B. DOE 31B is used in that case in transmission. As in FIG. 12, the phase shift, which, for example, results in a virtual quasi-Bessel beam profile, as well as the focusing property of far field optics are combined within the DOE 31B.

The optical systems of FIGS. 9 to 13 can result in output intensity profiles that correspond to inverse quasi-Bessel beam profiles and that are attributed to virtual optical images. The optical system of FIG. 7 as well as analog setups for FIGS. 9 to 13, for example, with a regular in transmission used axicon can result in output intensity profiles of (regular) quasi-Bessel beam shapes. For the utilization of cutting procedures based on local effects, inverse quasi-Bessel beam profiles and regular quasi-Bessel beam profiles can similarly be used, wherein of course the herein disclosed differences need to be considered.

Figure 14:
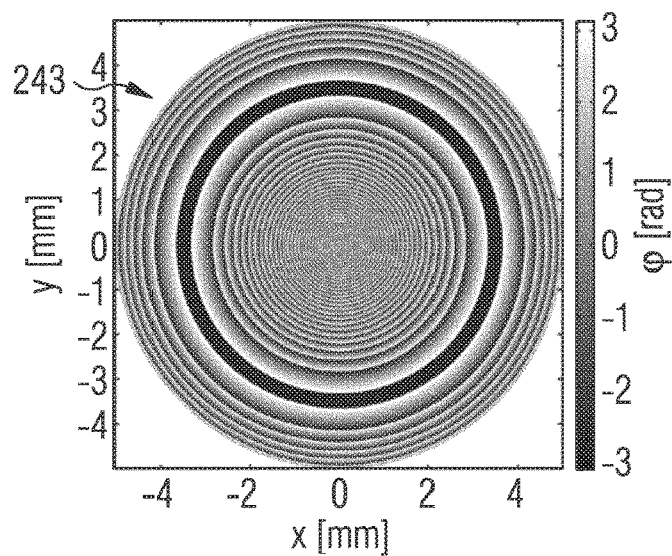
FIG. 14 is a schematic illustration of an example of a phase distribution in a diffractive optical element in an optical system according to FIG. 13.

FIG. 14 illustrates an example of a phase distribution 243 as it can be provided e.g., in DOE 31B. Phase distribution 243 is rotationally symmetric. One recognizes ring-shaped phase distributions, the frequency of which is modulated in radial direction. The rings point to the generation of a rotationally symmetric virtual quasi-Bessel beam profile. The frequency modulation points to the integration of the phase component of the far field optics in the phase distribution for beam shaping. In FIG. 14, the phases are indicated in the range of $\pm\pi$. In alternative configurations, discrete phase distributions such as binary phase distributions or multi-step (for example, 4 or more levels in the range of the phase shift from 0 to $2\pi$) phase distributions can be implemented in DOE phase masks.

Figure 15:
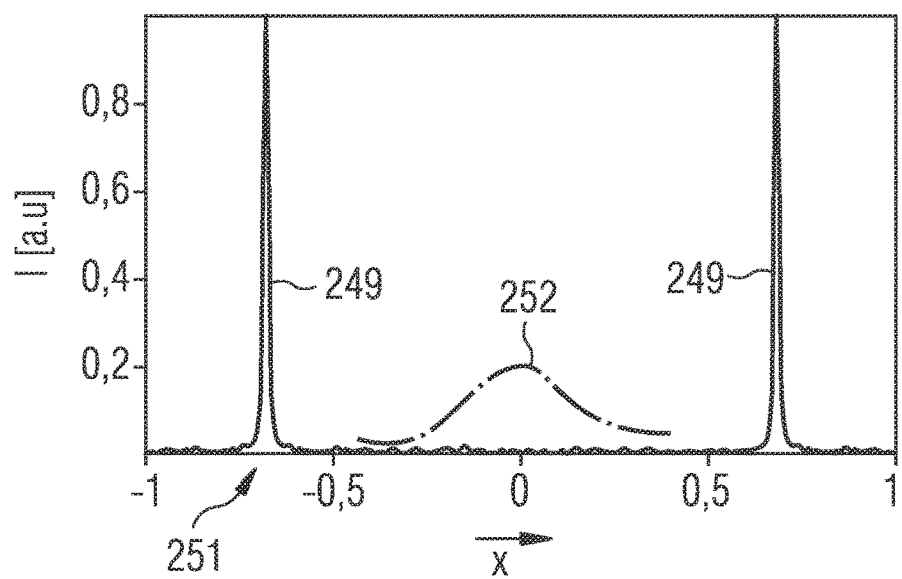
FIG. 15 is an exemplary intensity cross-section of an output intensity profile in an optical system according to FIG. 13.
Figure 16:
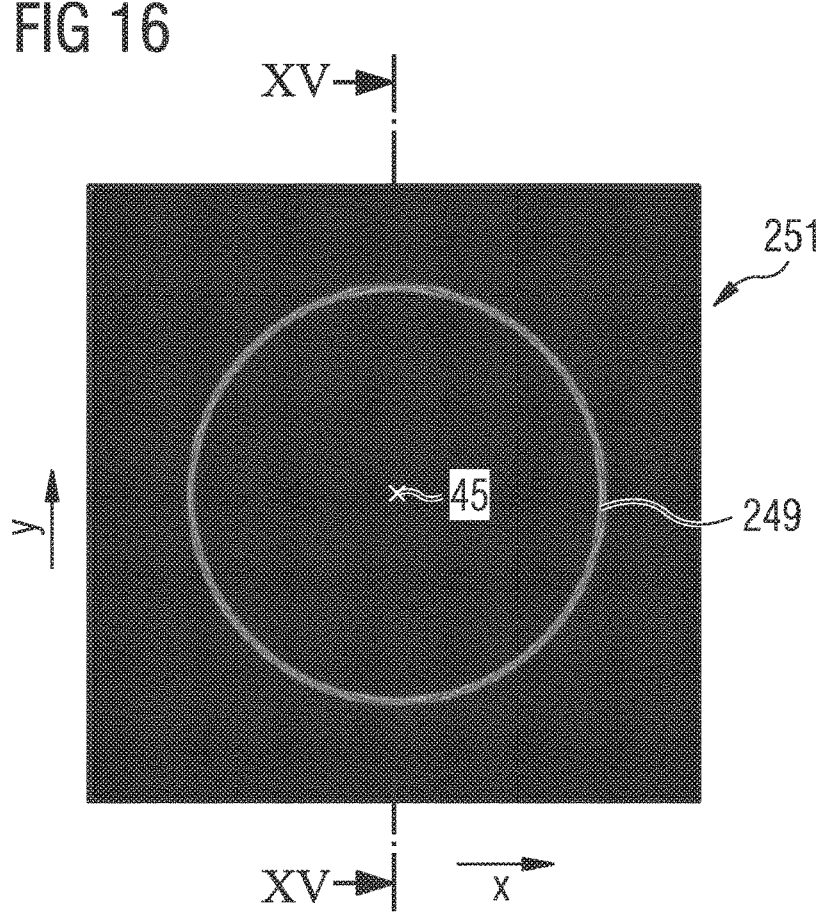
FIG. 16 is an XY-view of the output intensity profile of the intensity cross-section shown in FIG. 15.

FIGS. 15 and 16 illustrate exemplarily an output intensity profile 251 within the intensity cross-section (FIG. 15) and in the 2D-top view (FIG. 16). One recognizes an intensity maximum 249 extending in a ring shape around beam axis 45. There is hardly any intensity in the beam center.

In some embodiments, the transition into the inverse quasi-Bessel beam will not be complete such that accordingly a non-phase-modulated remaining beam, for example with a Gaussian beam shape, is superposed to the ring-shaped intensity profile. FIG. 15 indicates schematically such a non-phase-modulated beam portion 252 by a dash-dotted line.

Maximum 249 of that intensity distribution in FIG. 15 is an example of a local intensity maximum, with which an original input intensity profile (e.g., a Gaussian beam profile) was modified in the area of the transverse output intensity profile. The rotational symmetry of the ring structure is due to the rotational symmetry of the inverse quasi-Bessel beam profile. In alternative embodiments, the local intensity maximum is limited to an azimuthal angular range. In addition, a superposition of azimuthal limited and/or ring-shaped local maxima may be given.

When using a refractive hollow cone axicon (see FIGS. 9 and 10) for the generation of an inverse quasi-Bessel beam-shaped output intensity profile, undesired beam portions may be created under undesired angles for a non-perfect tip of the axicon. Also for diffractive beam shaping elements, non-desired beam portions may appear. For example, a non-phase-modulated beam portion, which cannot be neglected, or additional orders of diffraction in the far field of the laser beam can be present.

The herein disclosed optical systems simplify, by using the far field components, the insertion and the shape selection of filters to filter out such disturbing beam portions. In particular, these undesired beam portions can be separated from the desired beam portions (beam for use) in a simple manner in the area of the Fourier plane.

Figure 17:
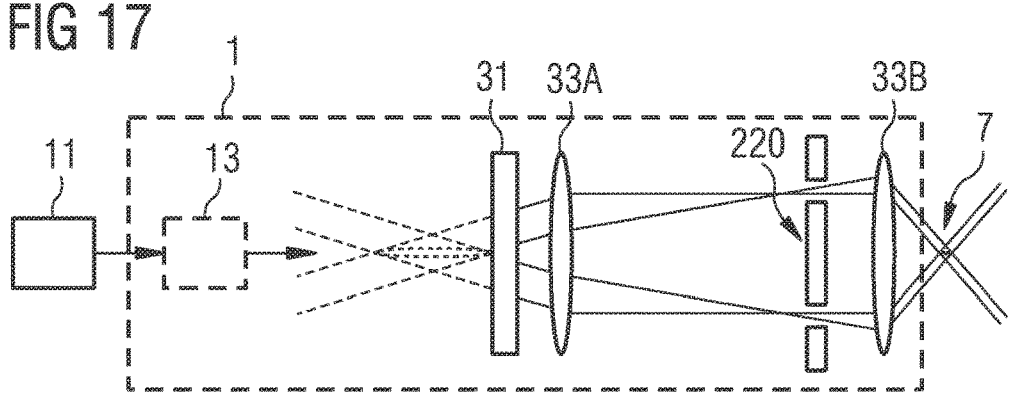
FIG. 17 is a schematic illustration of an example of an optical system with filtering non-phase-modulated beam portions.

Referring to the non-phase-modulated beam portion 252 of FIG. 15, FIG. 17 shows an exemplary optical system that is based on the optical system shown in FIG. 3. However, additionally a filtering of non-phase-modulated portions is performed in the area of the Fourier plane of imaging system 33. Exemplarily, a spatial filter unit 220 is indicated upward of near field optics 33B in FIG. 17.

Filter unit 220 includes a central area around beam axis 45 that blocks, for example, the Gaussian intensity distribution—indicated in FIG. 15—of the non-phase-modulated beam portion 252. Filter unit 220 can additionally include sections, which are located radially further outside, for blocking higher orders of diffraction by the DOE or the SLM.

In general, filter unit 220 is provided for the suppression of non-phase-modulated base modes and higher diffraction orders as well as of scattered radiation of the various herein disclosed refractive, reflective, or diffractive beam shaping elements. For rotationally symmetric output intensity profiles, usually also the filter unit is made rotationally symmetric. In some embodiments, only some portions of filter unit 220 or no filtering at all is provided.

Diffractive beam shaping elements allow a further approach for suppressing the non-phase-modulated beam portions. For this, an additional phase contribution is imposed to deflect the phase-modulated beam portion.

Figure 18:
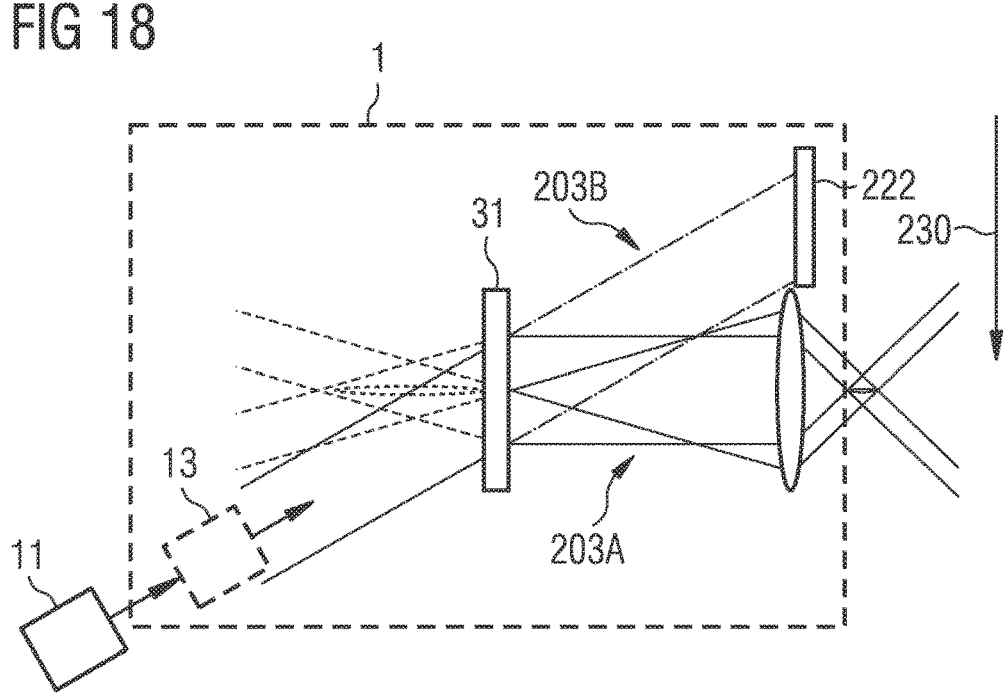
FIG. 18 is a schematic illustration of an example of an optical system based on a diffractive optical element with a linear phase contribution for separating a phase-modulated beam portion.

FIG. 18 shows, for example, an optical system in which the diffractive optical element 31 is additionally provided with a linear phase contribution. The linear phase contribution results in a deflection 230 of phase-modulated beam portion 203A. Non-phase-modulated beam portion 203B is not deflected and impinges, for example, on a filter unit 222.

Figure 19:
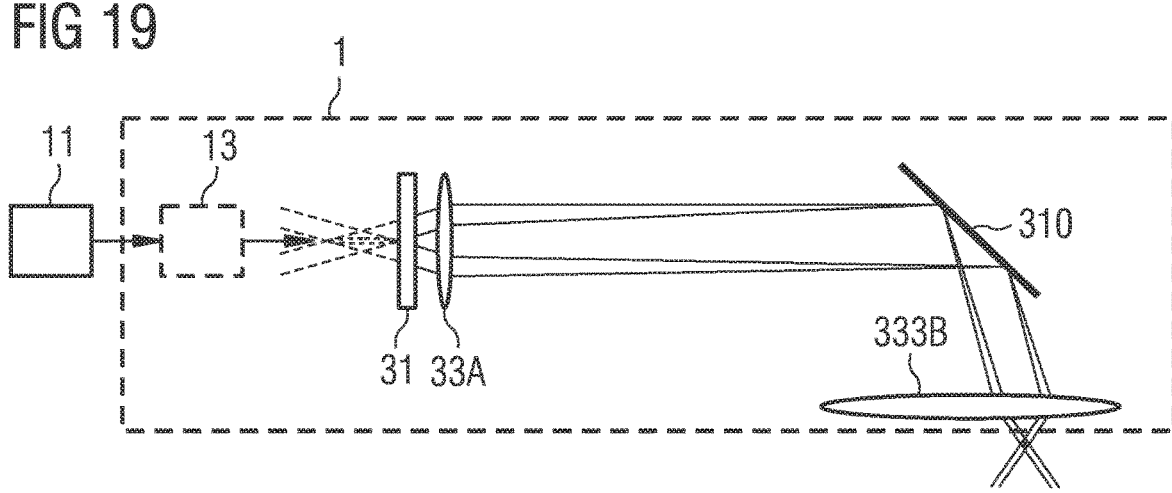
FIG. 19 is a schematic illustration of an example of an optical system with a scan device.

FIG. 19 shows a further embodiment of an optical system that utilizes the use of the far field component additionally for the implementation of a scan approach. In general, a scan system allows shifting focus zone 7 within a certain range. In general, it is possible by the separation of the beam shape from the near field focusing to provide favorable telecentric scan approaches, in particular for the volume absorption. In some embodiments, in addition the location as well as the angle can be set. Accordingly, such scanner systems can allow writing fine contours into a work-piece.

In the configuration of FIG. 19, a scanner mirror 310 is positioned at the image side focal plane of a near field optics 333B. Scanner mirror 310 deflects the laser beam in the range of the output intensity distribution onto near field optics 333B positioned at the side. The deflection in the Fourier plane results in that the propagation direction in the work-piece is preserved despite the displacement in location. The scanning region itself is determined by the size of near field optics 333B.

If scanner mirror 310 is not correctly positioned in the focal plane of near field optics 333B or if it can be moved with respect thereto, then an orientation of the elongated focus zone, in particular an angular deviation from the Z direction in FIG. 2, can be set.

Figure 20:
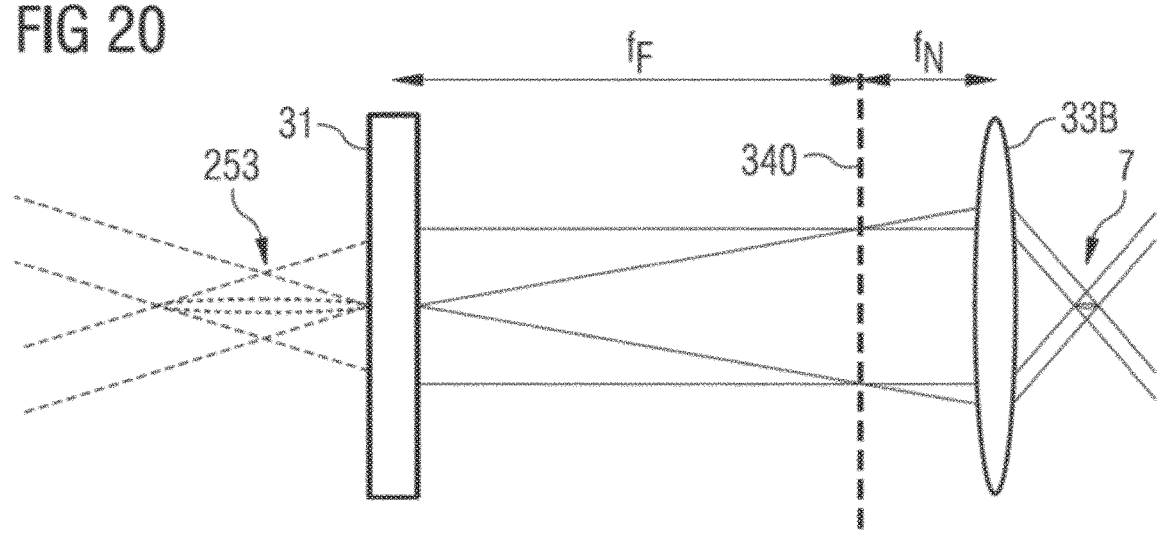
FIG. 20 is a schematic illustration for explaining the imaging system of an optical system.

With the help of a configuration in accordance with the optical system shown in FIG. 13, FIG. 20 explains exemplarily the underlying imaging features. The optical system includes a beam shaping element 31 that operates also as a far field optics and is therefore characterized by a focal length fF. In addition, the optical system includes near field optics 33B that is characterized by focal length fN. In FIG. 20, the focal planes of the far field optics and the near field optics coincide. Accordingly, in FIG. 20 only one focal plane 340 is indicated by a dashed line. In that configuration of overlapping focal planes, the imaging system images for incidence of a plane wave front generally a virtual beam shape 253 onto elongated focus zone 7, for example, an inverse quasi-Bessel beam profile, inverse modulated or homogenized quasi-Bessel beam profiles as examples for inverse quasi-Bessel/Airy beam shapes (e.g., inverse quasi-Bessel like beam shapes, inverse quasi-Airy like beam shapes).

Though the focal planes do not need to overlap always. For example, the imaging system can be adapted to a given beam divergence, but laser beam 3 may be incident with another divergence. In those cases, still a virtual optical image being positioned in front of the beam shaping element is attributed to elongated focus zone 7, but it does not need to be a perfect imaging. A similar situation may be given for an intended misalignment of the imaging system, for example, in connection with a scanner device.

FIG. 20 illustrates in addition the terms "far field optics" and "near field optics". The far field optics creates the far field of virtual beam path 253 in the range of far field focal length fF. As previously already explained, the far field optics can be distributed in its function, for example, be made of one or more components, which are arranged before and/or after the beam shaping element and displaced with respect to the same, and/or be integrated into the beam shaping element. The near field optics focuses the beam with the smaller focal length fN in the direction of the work-piece and thereby forms the focus zone. Thus, the far field of virtual beam profile 53 with respect to the far field optics, as well as the far field of focus zone 7 with respect to near field optics 33B is positioned in the area of focal plane 340.

Also for non-perfect imaging (e.g., non-overlapping focus planes of far field optics and near field optics), essentially an acceptable intensity distribution in the focus zone can be given, because the intensity profile, which impinges onto the near field optics, changes only a little.

For example, in the case of an inverse quasi-Bessel beam shape, the first focusing by the far field optics within the optical system causes an adaptation of the ring size on the near field optics. In that manner, the far field optics has a focusing action onto the ring diameter, which, as indicated in the figures, decreases up to some type of intermediate focus.

FIG. 21 illustrates the beam path in an optical system for the case that a convergent laser beam 3' impinges on beam shaping element 31. Phase-modulated portion 303A of the laser beam is focused onto elongated focus zone 7. Due to the convergence of incident laser beam 3' (and eventually due to a separate focusing far field optics or an integration into the phase distribution of beam shaping element 31), the non-phase-modulated portion 303B (dash dotted line) decreases further during the propagation length Dp and impinges on a central area of near field optics 33B. Thereby, a focus 350 for non-phase-modulated beam portion 303B is formed that is closer to near field lens 33B than it is elongated focus zone 7. The non-phase-modulated portion is strongly divergent after focus 350, so that those intensities are no longer reached within the work-piece with respect to the non-phase-modulated beam portion 303B that result in nonlinear absorption. In such a configuration, one can do without filtering non-phase-modulated beam portions 303B.

Nevertheless, a spatially localized filter unit can be provided in the area of focus 350 (or even between far field optics and near field optics, if the beam is strongly focused) such that non-phase-modulated beam portion 303B is kept out of the interaction zone and the work-piece.

Regarding further embodiments, it is in particular referred to the priority application DE 2014 116 958.1 of the same applicant filed on 19 Nov. 2014. The content of that application is incorporated herein in its entirety. For example, one or more additional lenses may be arranged upstream of the beam shaping element for the adaptation of the beam divergence.

Diffractive optical elements allow a digitalized and e.g., pixel based phase adaptation over the input intensity profile. Starting from the intensity distribution of an inverse quasi-Bessel beam shape, a longitudinal flat top intensity profile can, for example, be generated in focus zone 7. For that purpose, the phase distribution within the beam shaping element can be influenced such that intensity contributions in the output intensity profile are taken out of the area, which forms the intensity maximum and the tails of the Bessel beam, and are radially redistributed by a phase change such that, for the later focusing by near field optics 33B, the increasing area 61A and the decreasing area 61B are magnified or far extending tails are avoided to the most part (e.g., by pushing power from the tails into the homogenized area).

Modification zones are formed essentially always over the same range of extent in Z direction within work-piece 9. This is based on the essentially constant intensity having only a short increase and drop off. With increasing energy, however, not only the strength but also the lateral extent of the modification zones increases.

Moreover, supplemental phase imposing can generally be done in the area of the image side focal plane of near field optics 33B such as lateral and/or longitudinal multi-spot phase imposing. In particular, the formation of an accelerated Airy beam shape is possible.

In some embodiments, an optical system is configured, for example, such that a real intensity enhancement in accordance with FIG. 7 as well as a virtual intensity enhancement in accordance with FIG. 3 is created. Thereby, the longitudinal extent of modification zones can be widened.

An inverted quasi-Bessel beam can be generated with the herein disclosed refractive, reflective, and diffractive optical systems, for example, with the hollow cone axicon systems and the DOE systems. A DOE system can be based, for example, on the phase distribution of a phase mask shown in FIG. 14, in which a focusing phase contribution is provided in addition to the phase required for the inverse quasi-Bessel beam.

Usually, a laser beam having a rotationally symmetric Gaussian beam profile is irradiated onto the beam shaping element. A Gaussian beam profile includes a transverse amplitude course that runs through the beam center in a Gaussian manner.

Due to the pure phase mask, a Gaussian beam profile and a Gaussian amplitude course are present directly after the beam shaping element still similar to the Gaussian beam. Then, a sharply limited hole forms immediately, however, caused by the imposed phase, which yields the divergence that is continuously growing. At the same time, a ring area with higher amplitude is formed. Ring area is sharply limited towards the inside which can be seen at a step shape in the radial amplitude/intensity distribution. A flank of the circumferential step faces towards that beam axis/towards the beam center. With increasing z values, the opposing sections of flank get separated, i.e., the central sharply limited hole grows fast in diameter (D1<D2).

In the radial amplitude/intensity distribution, ring area drops towards the outside with increasing z values faster and faster. In the far field, i.e., for example in the overlapping focal planes of the imposed focusing far field action and the near field optics, a sharp ring is formed within beam profile, that thereafter diverges. Thereby, now a sharp edge is performed at the outer side, i.e., the step of the inner flank now faces towards the outside.

This general behavior of the beam profile and the amplitude courses enable a test of an optical system with a Gaussian input beam, for which at first a hole forms with a steep flank facing the inside and thereby results in a local maximum outside of the beam axis in the far field. An imaging of the beam profile from the inner area as well as in the area of the focus zone can identify the respective beam profile. The use of the optical system is thereby not necessarily limited to Gaussian beams. In addition, it is to note that the figures are a result of calculations for the ideal case. For example, if a non-ideal DOE is used, the addressed non-phase-modulated portion for higher orders or a portion of a real quasi-Bessel beam (such as for a bi-nary mask) can be on the beam axis and can fill the "hole" with intensity.

An inverse quasi-Bessel beam can therefore include a step with a steep flank in the amplitude course and accordingly in the intensity distribution. The same can in particular face to the inside in the area close to the beam shaping element, for example, in the area up to half of the far field, and in particular in the area of a focus length of the far field optics downstream of the beam shaping element. For a "simple" inverse quasi-Bessel beam without base at the beam axis, the amplitude/intensity increases in the range of the step from almost zero to the maximum of the phase-modulated beam portion. Thereby, the formation of the step (within the phase-modulated beam portion) is also given for an exemplary incident beam having essentially a constant radial intensity (radial flat top) across the beam shaping element, because the step concerns essentially the beam center.

The beam characteristic described before upstream of the far field focal plane is thereafter radially inverted up to the focus zone. After that focus zone, it inverts radially another time such that again a step shape can be formed at that position—without interaction with a material to be processed. The beam profile can, for example, be analyzed by taking the beam at a respective position, be it within the optical system after the beam shaping element or before or after the focus zone. In particular, for setups that allow a blocking of a central disturbing beam, one can analyze the intensity distribution of the phase-modulated beam portion before or after the focus area.

In this context, it is further referred to the German patent application DE 10 2014 116 957.3 entitled "Optisches Strahlformungselement" filed by the same applicant on Nov. 19, 2014 that in particular discusses optical systems for beam shaping. The content of that application is herein incorporated in its completeness. As is explained therein generally, inter alia inverse quasi-Bessel beams can be used for laser material processing.

The herein disclosed concepts allow influencing the focus zone in longitudinal direction and lateral direction. In particular, the use of a DOE as an example for an areally configured phase mask enables a simultaneous imposing of multiple phase distributions on laser beam 3. For generating an inverse quasi-Bessel/Airy beam, a virtual optical image is attributed to at least one of the phase distributions, wherein the virtual optical image can be imaged into an elongated focus area for forming a modification in the material to be processed by the laser beam. In the presence of two such phase distributions, that result in at least partially overlapping focus zones or focus zones, which at least influence each other, one can shape the geometry of the modification (s) of the material to be processed—generated by a laser pulse or a group of laser pulses.

In general, such phase distributions can form one or more ring structures, a ring segment structure limited to an angular range (see e.g., FIG. 28), and/or one or more local maxima (see e.g., FIG. 33) in a transverse far field intensity distribution (exit intensity distribution).

Several such phase distributions can be imposed in various manners. An association of segments on the phase mask is most obvious (see e.g., FIG. 26). These segments can be separate areal regions, wherein the separate regions can e.g., join radially and/or azimuthal with respect to each other and can transition into each other, for example, abrupt or weighted in the border region. Moreover, the segments can be at least partially encapsulated into each other (see e.g., FIG. 31). Finally, the phase increase, which is created by an (areal) portion of the areally configured phase mask, can be a combination of phase contributions that are respectively attributed to such a phase distribution. Besides the DOE configurations described in the following, for example, also respectively combined hollow cone axicons or reflective axicons (with respect to an inverse Bessel beam) and axicons in general (with respect to regular Bessel beams) can reproduce an areal segmentation. One should understand the following examples for explaining potential concepts accordingly, wherein the concepts can also be realized with other approaches for phase imposing that were addressed before and are herein disclosed. In general, several optical elements can be combined within a DOE, by determining e.g., the transmission function of all elements (e.g., hollow cone axicon(s) and lens(es); adding the individual phase functions $(\exp(-1i\ (phi1+phi2+\ \ldots\ ))))$. In addition or alternatively, some type of superposition of individual transmission functions can be done. For the determination of the phase distributions, it was initially referred to the publication of Leach et al.

For segments, which are rotationally symmetric, also the intensity distribution is rotationally symmetric and each interference maximum corresponds to a volume area, in which the intensity/fluence can be above a threshold intensity/fluence.

The aspects described in the following are based on that initially addressed realization that the density of free electrons, which can develop within the material by nonlinear absorption, can be tailored by a targeted beam shaping, for example, with a diffractive optical element (DOE). Along the resulting modifications, a crack formation can be specifically guided that then causes the separation of the workpiece. Moreover it was recognized that regular and inverse Bessel beam types are suitable in particular for using an aperture for the targeted beam shaping because they include a ring-shaped far field for introducing the aperture.

The crack formation can occur or be initiated after introducing all modifications, which delimit a contour, by applying an in particular thermal or mechanical induced tension. Depending on the choice of parameters of the laser and depending on the material, the crack formation can already take place during the writing of the modifications. When initiating the crack formation during the creation of modifications, the crack is preferably guided to follow the latest generated modification, i.e., the crack forms against the feed direction.

For example, it was in particular recognized that, for the buildup of the preferred direction for separating transparent materials, an intensity distribution, which deviates from the rotational symmetry, can make a crack creation at the same time or in a successive step along the set preferred direction. In other words, the intensity distribution is no longer rotationally symmetric in that XY-plane, i.e., in the plane orthogonal to the beam propagation direction, instead it is e.g., ellipse-like. An intensity maximum in the focus zone is surrounded by a respective area of increasing high intensity, wherein herein both together is understood, in particular in view of the behavior for crack formation, generally as intensity maximum of a focus zone, and in this context the intensity maximum should be understood not to be reduced to the maximum value itself.

In general, a focus zone is assumed that has an elongated extent in propagation direction of the laser beam as well as an in particular asymmetric extent in the plane transverse to the propagation direction. A similarly shaped modification is created, respectively. If the focus zone includes in its extent in array of several focus points with local intensity maxima within the envelope of the focus zone, a respective array of modifications with sub-focus zones is formed. Also the intensity distributions of such focus points can have an in particular asymmetric extent in the plane transverse to the propagation direction. If the envelope shape of the focus zone is flattened in the plane transverse to the propagation direction, focus points can be shaped by interference effects, wherein the focus points are also flattened in orthogonal direction with respect to the flattening of the envelope (see FIGS. 20B and 23B).

With respect to the generated separating effects, the intensity areas are—based on the underlying laser parameters and that underlying material properties—decisive that lie with respect to a separating effect above a respective threshold. If this is the case for individual sub-focus zones, the same can influence the crack formation; if essentially only one zone in the shape of the envelope is above the threshold, this one will influence the crack formation.

FIGS. 21A and 21B illustrate the asymmetric beam shape in the X-Y-plane exemplarily as an elongated ellipse 400—be it a single modification or the modification due to a sub-focus zone.

A quasi-forced formation of a preferred direction of the crack formation can e.g., allow using larger distances between modifications, i.e., in total less modifications are required. The separating can itself be improved, because one can avoid a random preferred direction of cracking. In contrast, the "random" preferred direction of cracking can establish itself for modifications, which are in the X-Y-plane "point"-shaped or in space spherical or round pillar-shaped (rotationally symmetric), partly by material-specific or separating path-specific parameters such as e.g., a (pre-)tension in the material, a curvature of the material, and an implicitly given crystal structure.

The herein proposed crack and guiding can allow, in a controlled manner and in particular for fragile structures, an insertion of a crack close to a border or a previously generated contour. Moreover, the crack guiding can take place during the modifying without further processing steps, so that a time-saving can occur by less process steps.

When using asymmetric focus zones for generating modifications with a preferred direction, the asymmetry can be parallel to the feed direction. In FIG. 21A, this would be a feed direction in X direction. This can result in the generation of a shockwave within the material, which may cause a crack formation along the modification (in FIG. 21A in X direction). I.e., depending on the material, an alignment of a, for example, in the X-Y-cut ellipse-like shape along the feed direction may cause a crack formation in direction of the length axis of the ellipse. This will be magnified by the respective sequence of modifications in feed direction.

The generation of shockwaves is well-known in the prior art. Thereby, around the modification, strong tensile stress is created, which acts orthogonal to the modification borders. (In the hereinafter explained FIG. 21A, these were solid arrows 402.) For elongated modifications, therefore the largest tension is created along the largest extent(s). For a modification array, the action of the individual modifications accumulates, so that in an asymmetric array the separating plane also runs in direction of the largest extent of the array.

With the help of a suitable beam shape and a suitable selection of laser parameters in dependence of the material parameters, the density of free electrons, which are generated within the material by nonlinear absorption, can be set such that the shockwave effect or the thermal stretching can be used for inserting a separating plane and/or a crack. Depending on the material, the degree of precision, the processing velocity, and further boundary conditions such as the distance between separating lines, the one or the other effect may be more advantageous.

Also if, for the creation of the modification, a melted volume with asymmetry in feed direction is created (in particular with low viscosity), for example, in the XY-cut in the shape of an ellipse, that alignment can cause a crack formation in direction of the asymmetry, for example, in direction of the length axis of the ellipse.

The asymmetry can further be present across to the feed direction, if asymmetric focus zones are used for creating modifications with a preferred direction. In FIG. 21A, this would be a feed direction in Y direction. Also this orientation, which intuitively deviates from the thought of a "cutting knife", can achieve results that for some materials and beam parameters increased the quality of the separating surface in comparison to the parallel alignment or rotationally symmetric intensity distributions.

It is assumed that by the thermal expansion of the modification (the material becomes in some cases heavy viscous) a stretching and thereby pressure tension along the solid arrows 402 in FIGS. 21A and 21B onto the surrounding material is created. The expansion can be e.g., transient or permanent. Due to the elongated shape, the pressure tensions induce a tensile tension along the dash dotted arrows 404, i.e., in X direction and across to the elongated shape of the intensity distributions in the plane transverse to the beam direction. The effect of a plurality of modifications, in particular also of smaller extent, can add onto each other, so that—as indicated in FIG. 21B—a crack 406 or a preferred location of formation for the crack forms between ellipses 400.

It is assumed that, for most transparent materials, the use of the shockwave as well as the thermal expansion can be utilize for influencing the crack formation. Which effect is caused, depends on the setting of the laser parameters, i.e., wavelength, pulse duration, repetition rate, fundamental frequency, pulse energy, pulse group energy, etc. As, when creating a shockwave, a preferred direction is formed in the direction of the largest extent of the asymmetric focus zone, the focus zone is to be parallel to the feed direction, when using that effect. As, for the thermal expansion, the preferred direction is generated across to the largest extent, the focus zone is to be guided across to the feed direction, when using that effect. For an array of multiple foci, attention has to be paid that the stretched out separation plane is guided parallel to the feed direction.

For an elliptical individual modification, for example, also only a tension can be formed within the material (still without crack formation); the material is then only set under pre-tension. Only when applying an external tension, the desired crack forms according to the distribution of tension being present. So, several transverse elliptical modifications can create a crack between the same, which extends across to the orientation of elliptical base shape 400.

In some cases, it was recognized that a crack formation does not yet occur for a single modification, instead cracks extent only for a sequence of several modifications, which were one after the other introduced in feed direction, from a preceedingly introduced to or up to within the subsequently introduced modification. Thereby, a crack can be avoided that runs ahead of the modification in feed direction and would be difficult to control in its orientation. In particular, if the tensile stress, which is required for the crack formation, is formed only in a transient manner, the simultaneous formation of several modifications being arranged in feed direction is advantageous as it is illustrated in FIG. 21B for a cut in that XY-plane in the case of ellipses.

If one includes the above considerations in the material processing of a material, which is in particular for the laser beam to a large extent transparent, asymmetric shaped modifications are formed transverse to the propagation direction of the laser beam. In that case, the laser beam can be appropriately focused for forming the elongated focus zone in the material, wherein the focus zone is configured such that it includes at least one intensity maximum, which is transverse flattened in a flattening direction. In FIGS. 21A and 21B, the respective intensity area/intensity maximum is flattened in Y direction. Moreover, sequences can be created, transverse to the propagation direction (see FIG. 21C in comparison with FIGS. 22C and 23C) and/or axially with respect to that propagation direction (see FIG. 21C in comparison with FIGS. 29 and 30—wherein FIG. 30 also shows a transverse sequence). Also those transverse and/or axial sequences of asymmetric intensity maxima can be flattened in sequence direction and thereby cause the effects for crack formation and crack guiding, which are herein described in particular in connection with FIGS. 21A to 21C, if in particular the material and the focus zone are moved relative to each other, so that, for successive laser pulses, modifications are created, which are displaced transverse in feed direction, along which the crack formation should take place with e.g., respective precision. According to the laser parameter and the material features, the modifications can create (be it on the plane of the focus zone or on the plane of a sub-focus zone) the above explained preferred direction for the crack formation, be it along or across to the length direction of the asymmetric shape.

FIG. 21C transfers the illustration of FIG. 21B to an array of three neighboring intensity distributions, wherein the intensity distributions are additionally modulated in Z direction. I.e., individual ellipsoids 410 are arranged on top of each other or next to each other, and e.g., are lined up in Z direction. Around each ellipsoid 400', the tension distribution of a potential separating zone 406' is indicated that can be created by the tensile stress along the (here solid) a-rows 404, wherein separation zones 406' can result together in the formation of a separating plane 410.

In general, such tensions can also be present in Z direction between modifications that are also lined up in Z direction. Separating plane 410 results from adding up the tensile stresses 404' that were created by ellipsoids 400'.

Figure 24A:
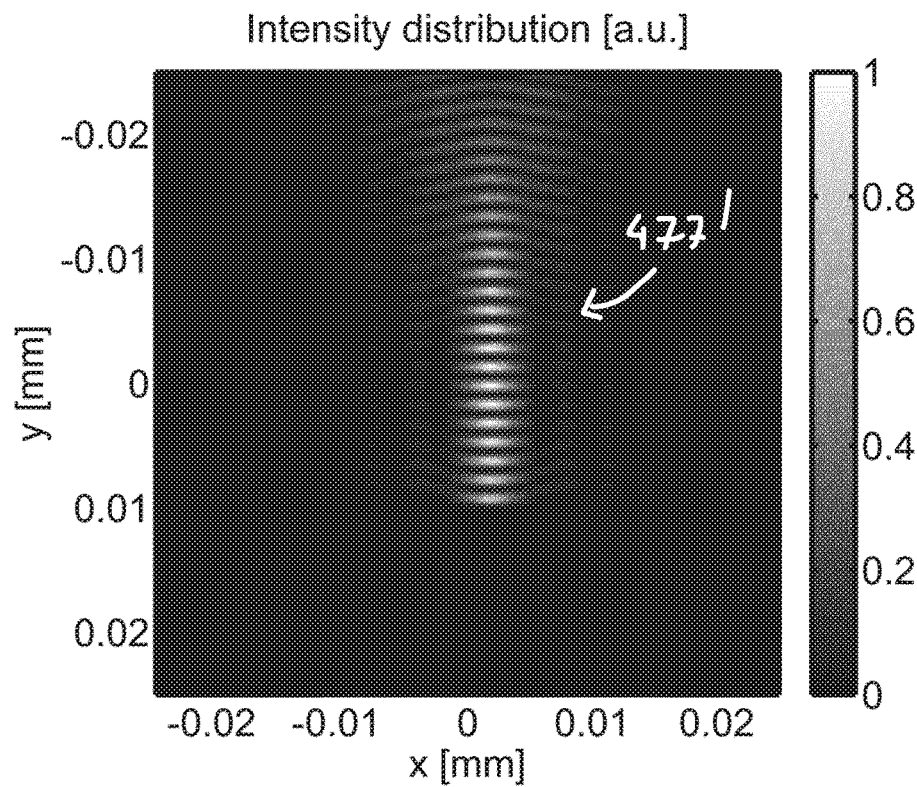
FIG. 24A and FIG. 24B are XY- and ZY-cuts for illustrating an asymmetric array of intensity maxima.
Figure 24B:
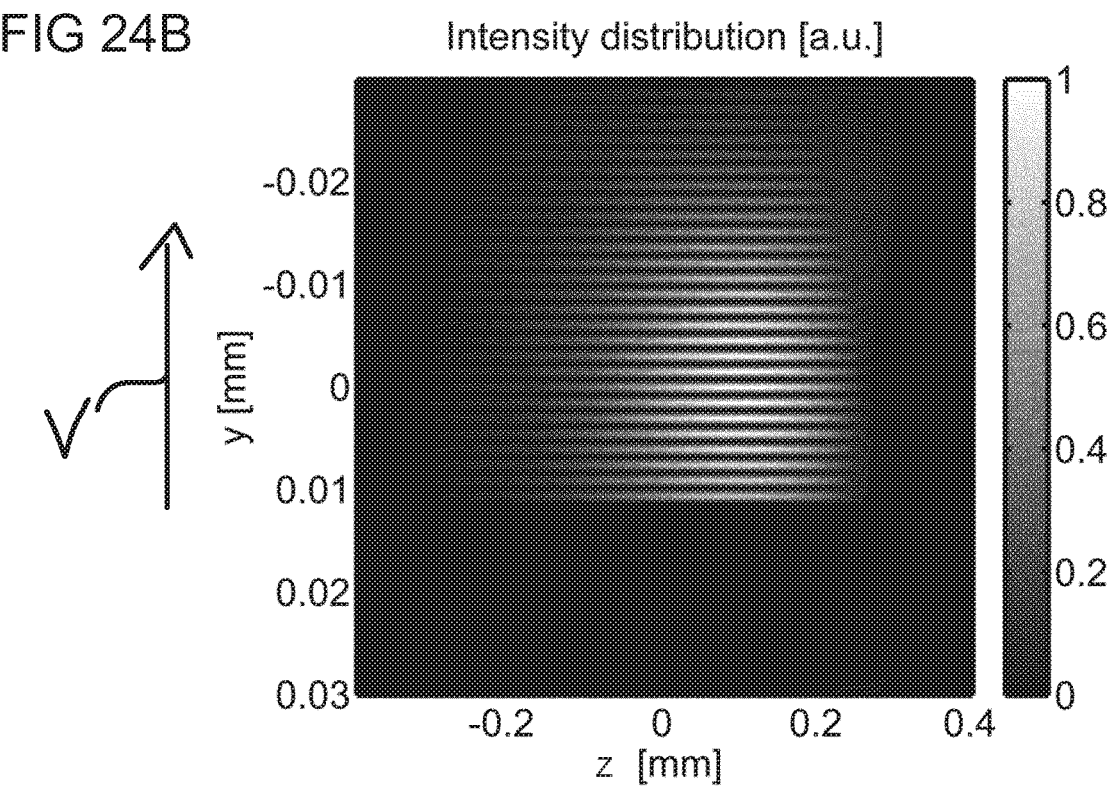

In the following, examples are disclosed for the generation of the asymmetry of the focus zone. On the one side, an aperture (see aperture 50 in FIGS. 3 and 7) allows forming a slit, which can be set in thickness and orientation, in the area of the imaging system 33, in particular focal plane 340. Two positions for the aperture will be explained in connection with FIGS. 22A to 23D. On the other side, a suitable asymmetry can be imposed by calculating the phase distribution of the DOEs. Exemplary phase distributions are shown in FIGS. 24A and 24B that can correspond to the positions of the aperture shown in FIGS. 22A and 23A.

Figure 22A:
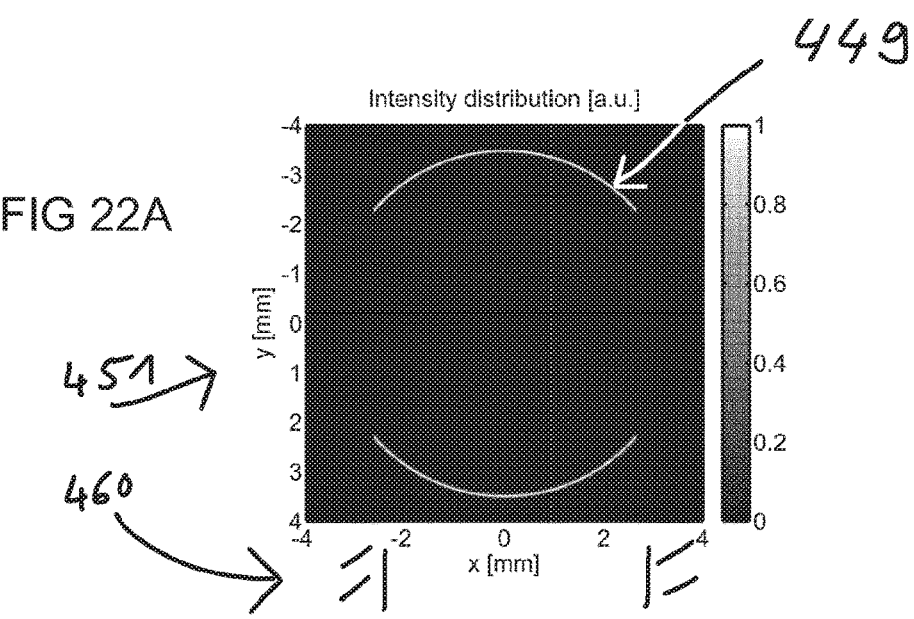
Figure 22B:
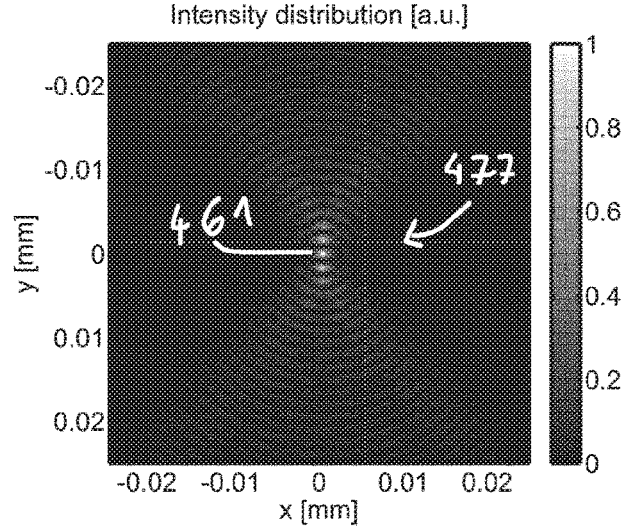

FIG. 22A illustrates exemplary an output intensity profile 451 in the intensity cross-section after passing aperture 50. Moreover, aperture opening 460 is exemplarily indicated in FIG. 22A. One recognizes two intensity maxima 449 that extend in a ring segment shape around beam axis 45. There is no intensity in the beam center. FIG. 22B illustrates an intensity distribution for a cut across the beam axis Z, and FIG. 22C shows an intensity distribution for a cut through beam axis Z within the focus area, as the intensity distribution could be the result of blocking out the border area in FIG. 22A.

Figure 22C:
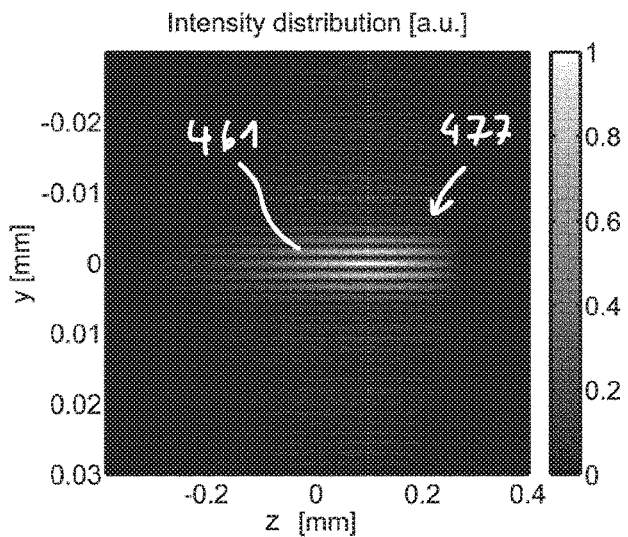

FIGS. 22B and 22C show an elongated focus zone 477 with a sequence of about 5 strong intensity maxima 461 in propagation direction, wherein the intensity maxima with almost similar intensities can reach into the material over an area of several hundred μm in Z direction. Interference maxima 461 are deformed in the cut across to the beam axis in a longitudinal manner, herein generally referred to as elliptical. The longitudinal axis of interference maxima 461 is lined up across to the direction of the sequence. For materials and laser parameters, which along with the considerations to FIG. 21B, cause a crack formation across to the length axis of the ellipse and accordingly in FIG. 22B along with the Z direction, the material is separated accordingly along the sequence of interference maxima 461.

For a smaller aperture opening 460' shown in FIG. 23A, FIGS. 23B and 23C illustrate that the number of interference maxima 461 increases when closing the aperture, and that the elliptical deformation in X direction increases. Elongated focus zone 477 shows now more than 10 intensity maxima 461.

FIG. 23D is an example for material processing of alumosilicate glass (gorilla glass) with a double pulse of a pulse duration of about 7 ps at a wavelength of 1030 nm. The total energy of 125 μJ results from two single pulse energies of 62.5 μJ that are irradiated at the temporal distance of 200 μs. The processing is performed e.g., at a base frequency of 2 kHz.

Regular and inverse Bessel beam-types are specifically suitable for the use of apertures to generate elongated focus zones because they include a ring far field for inserting of the aperture.

Both ways for creating asymmetry can allow steerability in the process of material processing. For example, the geometry can be set via the thickness of the aperture. A small slid results in broader ellipses as well as in more ellipses in e.g., feed direction.

For example, the width of the aperture can be opened wider for radii to be cut in order to shorten a modification zone. In addition or alternatively, tracking a curve can be supported by alignment of the beam profile. For example, the complete optical system or the work-piece can be rotated. Furthermore, (assuming a rotationally symmetric input beam) the aperture and/or the DOE can be rotated around the beam axis, so that the preferred direction can be changed during the material processing. In addition, online adaptable phase distributions can be used. In particular, for an aperture both sides of the aperture can be changed synchronously or the sides of the aperture can be controlled individually.

In general, modifications can be created such that the created tension decreases at ends of the array, in order to avoid an accidental swerve of the crack (e.g., forward). Similarly, modifications can be created, so that the array creates "towards the back" further more large tension, so that the crack extends to the foregoing introduced modification. The result is kind of a guiding together with the crack or a guiding tracking the crack (following).

Exemplarily, FIGS. 24A, 24B show respective cut views of intensity distribution 477' in the X-Y-plane (transverse to the beam) and in the Y-Z-plane (along the beam) of a linear array of focus zones extending into that material. One sees that intensities in the array increase against the feed direction V (here the feed is performed in the negative Y-direction). Accordingly, crack formations can extend towards previous modifications. In direction towards the not yet processed material, however, the tendency for crack formation is reduced. Such intensity distributions can be created by specific DOE-phase distributions and/or by superposing multiple beams.

Alternatively, the radiation field can be separated into two or more partial radiation fields, which are coupled into the material in a displaced manner, to achieve the desired asymmetry also when using rotationally symmetric radiation fields and partial radiation fields.

Figure 25A:
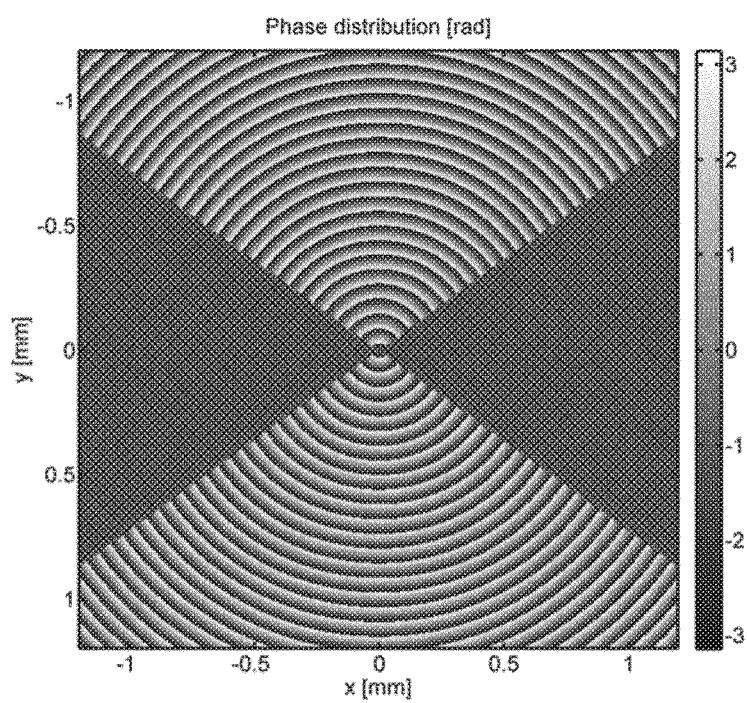
FIG. 25A and FIG. 25B are schematic illustrations of examples of a phase distribution in a diffractive optical element for asymmetric beam shaping.
Figure 25B:
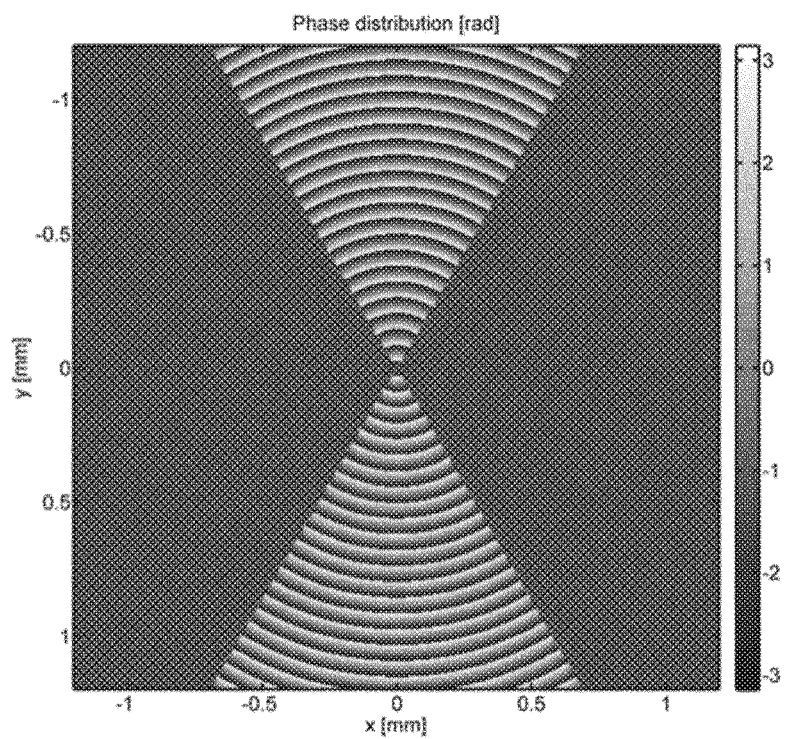

FIGS. 25A and 25B show, alternatively to the use of an aperture respectively configured DOEs. One recognizes a phase distribution on a phase mask that has an azimuthal segmentation. Two segments are opposed to each other— each in triangular shape with a rectangular peak of the triangle positioned respectively in the center. The areas of the phase mask positioned between the segments form two opposing segments with a phase distribution that scatters the light into spatial regions that are not interesting. In general, an incident Gaussian beam is directed onto the beam shaping element such that the center of the beam shaping element coincides with the beam axis of the incident beam.

The angular range used in the DOE of FIG. 25B is reduced (analog to the aperture opening in FIG. 23A) such that also here an elongation of the elliptical shape and an increase in the number of intensity maxima in the focus zone are caused.

The phase distributions of FIGS. 25A and 25B are obviously not rotationally symmetric. A rotation of the respective DOE results in a respective rotation of the focus zone and accordingly in a change in the orientation of the preferred direction for the crack formation—similarly in analogy to the rotation of the linear aperture opening around the beam axis because the beam portions along the X direction are subject to the phase distribution of the "X"-segments 970A and beam portions along the Y direction are subject essentially to the phase distribution of the "Y"-segments 970B.

Often preferred directions for the crack formation form that do not coincide with the desired separating plane. This can be caused, for example, by anisotropic work-pieces, for example crystals, by deviations in the symmetry of the work-piece symmetry, or by an astigmatism due to the beam entrance surface, for example, for a beam incidence deviating from orthogonal incidence, or a curved beam entrance surface. Often, such "random" preferred directions disturb the processing. By the specifically set asymmetry of the beam profile, the "random" preferred direction can be oversteered advantageously and can be transferred into a desired preferred direction.

Summarizing, an orientation of the preferred directional/the beam profile relative to the feed can allow an improved separation in feed direction, in particular a faster, more efficient, more robust separation of high quality.

In general, for the herein disclosed crack-supported separation, which is based on asymmetry, the intensity distribution can be introduced only into the material or it can be introduced to extend up to one or both surfaces.

In addition, besides multi-spot configurations, also modulated intensity distributions can be used, wherein the modulation can be present in the beam direction and/or transverse to the beam direction.

In other words, in particular the use of an aperture allows adapting the crack length to the contour. For example, a short extension in feed direction can be set at sharp curves and edges, and a long extent in feed direction can be set for straight separating lines.

Figure 26:
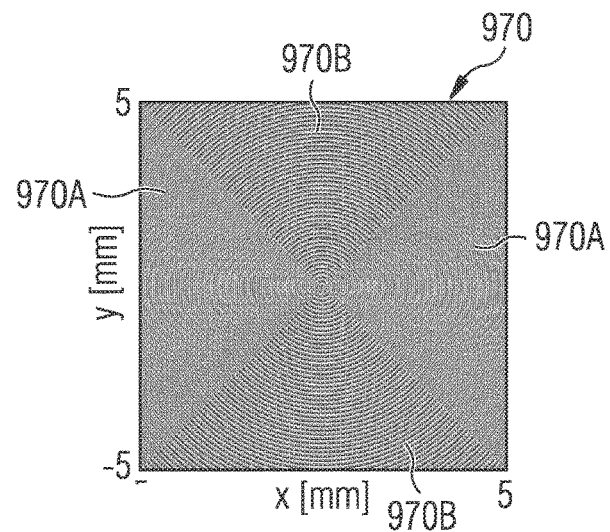
FIG. 26 is a phase distribution segmented azimuthal.

FIG. 26 shows a phase distribution 970 of a phase mask with azimuthal segmentation. A pair of "X" segments 970A are opposed to each other—each in triangular shape with a rectangular peak of the triangle positioned respectively in the center (corresponding to the beam axis). The areas of the phase mask positioned between "X" segments 970A form two opposing "Y" segments 970B—also in triangular shape with a rectangular peak of the triangle positioned in the center. In general, an incident Gaussian beam is directed onto the beam shaping element such that the center of the beam shaping element coincides with the beam axis of the incident beam.

In the example of FIG. 26, the transition of the phase distributions between the individual segments takes place abrupt. The phase distribution of FIG. 26 is obviously not rotationally symmetric because beam portions along the X direction are subject to the phase distribution of the "X"-segments 970A and beam portions along the Y direction are essentially subject to the phase distribution of the "Y"-segments 970B.

Figure 27:
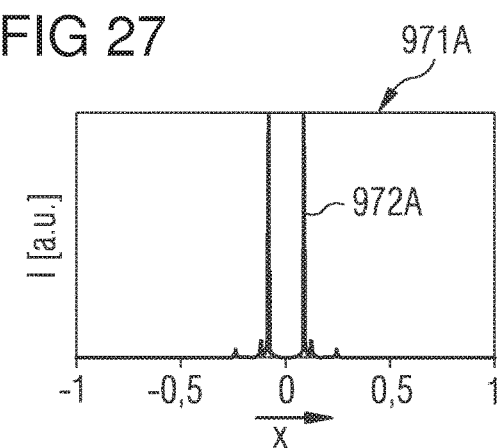
FIG. 27 is an exemplary intensity cross-section for phase imposing according to FIG. 26.
Figure 28:
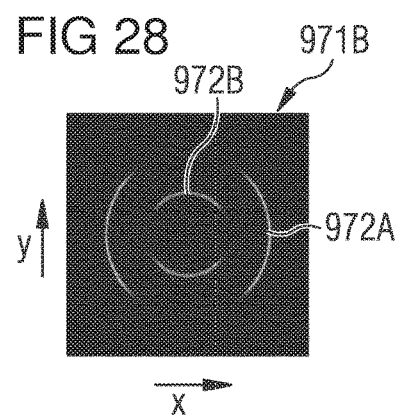
FIG. 28 is an XY-view of the output intensity profile of the intensity cross-section shown in FIG. 27.

FIGS. 27 and 28 show an intensity distribution 971A in X direction and a central portion 971B of an XY-view on an intensity profile as they can form in the far field focal plane. As the phase mask of FIG. 26 does not include a focusing phase portion, the same is used with a separate and therefore for both segments identical far field optics. In intensity distribution 971A and in portion 971B, one recognizes a two-part outer ring segment 972A of an intensity enhancement being located radially outside. In portion 971B, one further recognizes a two-part inner ring segment 972B of an intensity enhancement being located radially inside. The latter includes essentially no contribution in X direction (y=0). Accordingly, it is also not viewable as an intensity enhancement in intensity distribution 971A. Each part of ring segments 972A and 972B extends over 90°—according to the azimuthal segmentation.

In consequence, the azimuthal segmented phase mask of FIG. 26 results in an asymmetric intensity distribution in the far field. Moreover, a longitudinal interference structure can form due to differing angle portions. The asymmetry in the beam shape originates from the asymmetry in the segments. For identical angle portions in the segments and a phase shift of the segments of PI, e.g., an asymmetric beam shape without modulation can form, for which the distance of the thereby created inverse quasi-Bessel beams can be in the range of the beams themselves. The interference of the respective inverse quasi-Bessel beam shapes can accordingly result in an asymmetry/modulation in the transverse formation of the intensity distribution.

Figure 29:
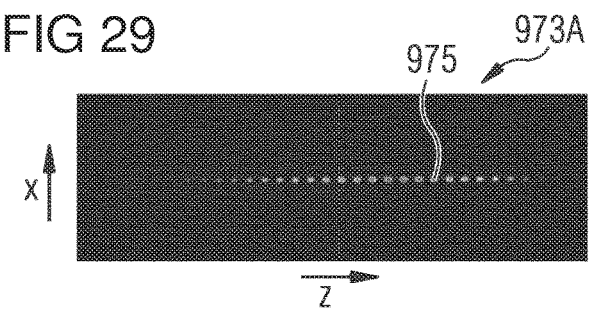
FIG. 29 is a ZX-cut of an elongated focus zone for a phase imposing according to FIG. 26.
Figure 30:
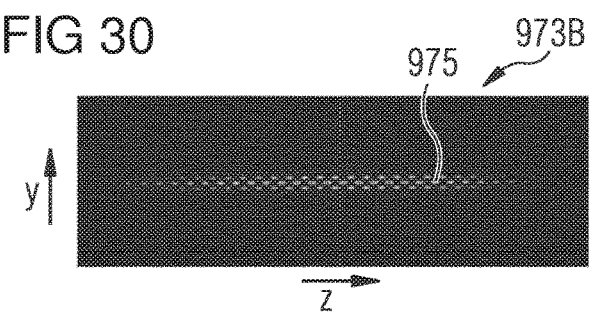
FIG. 30 is a ZY-cut of an elongated focus zone for a phase imposing according to FIG. 26.

Exemplarily, FIG. 29 shows a cut 973A in ZX-plane through a common elongated focus zone 973 of an intensity distribution, which originates from an output intensity distribution according to FIG. 28. FIG. 30 shows a respective cut in ZY plane 973B of the intensity distribution. One recognizes sequences of essentially linearly arranged intensity maxima 975. Intensity maxima reach significant intensities in a single row in FIG. 29 and in three rows in FIG. 30. In FIG. 30, the maxima of the outer rows in Z direction are thereby displaced with respect to the inner row. If one selects now the Y direction as feed direction for the material processing, then a single laser pulse (or a group of laser pulses) forms a focus zone/modification zone that is elongated in feed direction, i.e., is asymmetric. Accordingly, the width of the focus zone/modification zone is reduced in the separating direction, i.e., in the YZ-plane. Accordingly, the result is an arrangement of three "cutting" rows of intensity maxima 975. It is noted that herein grey scale illustrations of FIGS. 29 and 30 are based on color illustrations, so that maximal values of the intensity/amplitude are illustrated dark.

In other words, the asymmetry, which was created by the segmentation of the phase mask, in combination with inverse quasi-Bessel beam shapes can be used for the formation of a geometric direction of preference during separation. Also in this configuration, the end region of the focus zone/modification zone can be essentially independent from the irradiated energy and the beam diameter of the incident beam.

Figure 31:
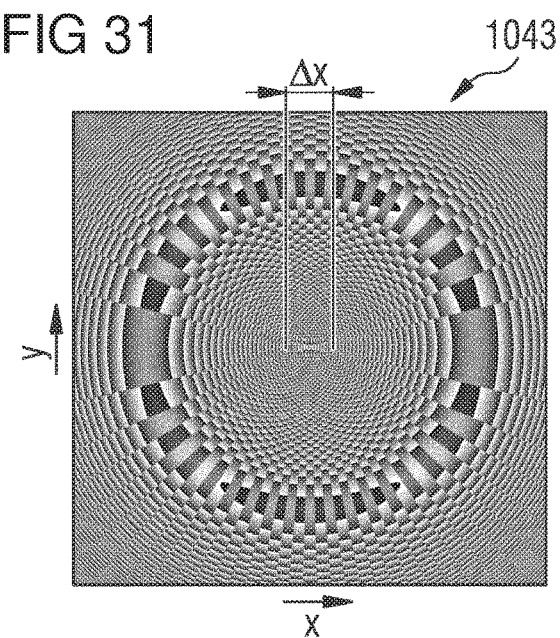
FIG. 31 is a phase distribution for generating two transverse displaced inverse quasi-Bessel beam profiles.

A further example for an interaction space in material 9 having asymmetric geometry is explained in connection with FIGS. 31 to 36C. FIG. 31 shows a phase distribution 1043 of a phase mask that is based on a superposition of two phase distributions. Each of the phase distributions belongs to an inverse quasi-Bessel beam as it can be individually generated, for example, with a hollow cone axicon. However, the centers of the phase distributions in X direction are displaced with respect to each other by $\Delta x$. Phase distribution 1043 includes further a superposition with a centrally arranged spherical phase, i.e., a focusing far field action is integrated in the phase mask being e.g., configured as a diffractive optical beam shaping element.

Figure 32:
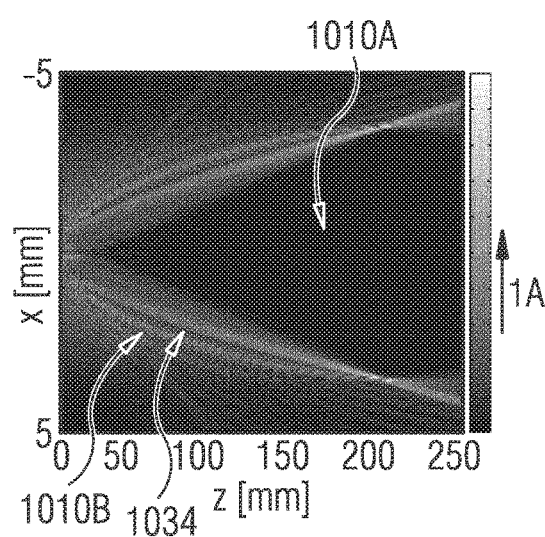
FIG. 32 is an amplitude distribution for a cut along the beam axis Z when propagating from the beam shaping element to the near field optics for a phase imposing ac-cording to FIG. 31.
Figure 33:
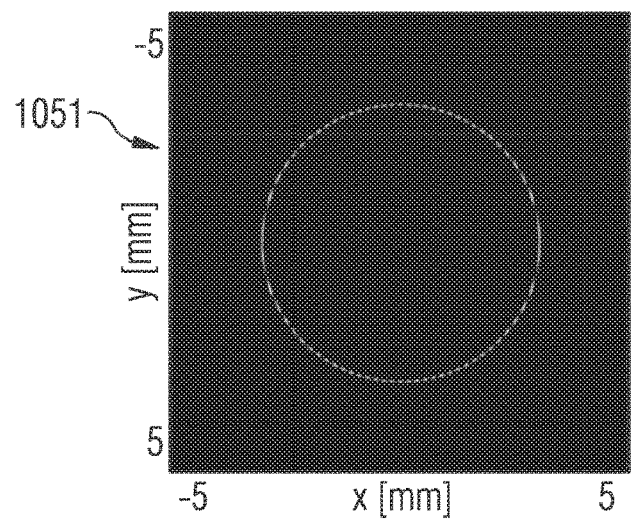
FIG. 33 is an XY-view of the output intensity profile for a phase imposing according to FIG. 31.

FIG. 32 shows an amplitude distribution for a cut along beam axis Z in the range from z=0 mm to z=250 mm as it can be the result of imposing phase distribution 1048. One recognizes a dark central area 1010A that widens in Z direction. Due to the only small laterally displaced phase distributions, diverse interference structures 1034 are formed in the bright intensity area 1010B that adjoins radially to outside central area 1010A.

The focusing far field action of phase distribution 1048 forms a ring in the respective focal plane, which is structured in its intensity. A respective output intensity profile 1051 is exemplary illustrated in FIG. 33. One recognizes local maxima, the extent of which is the largest in azimuthal direction in the X axis. The azimuthal extent decreases with increasing distance from the X axis and along the ring.

Figure 34A:
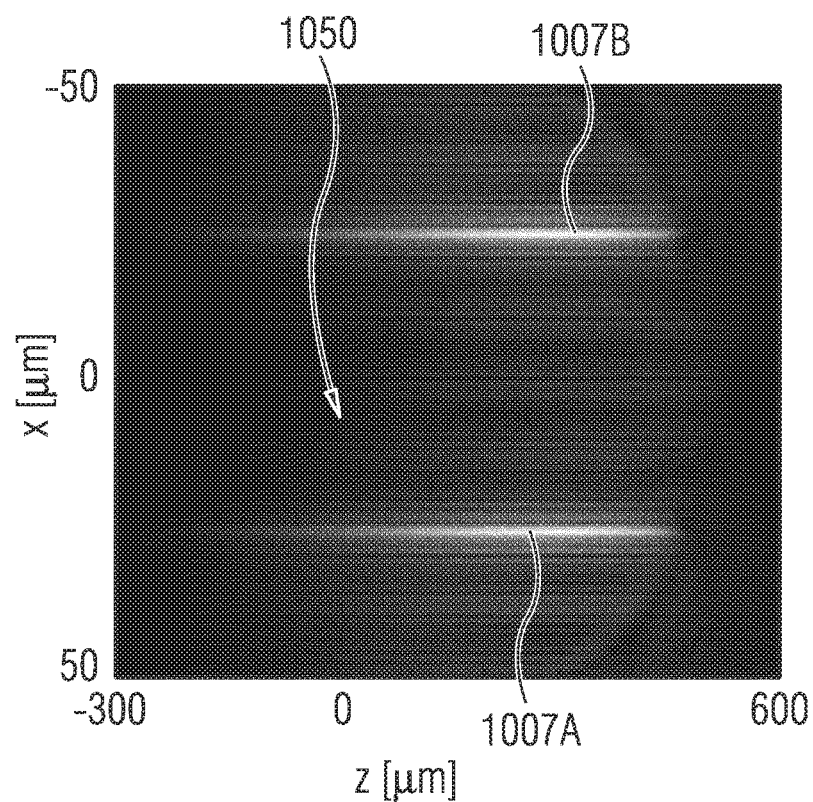
FIG. 34A and FIG. 34B are ZX- and XY-cuts of an elongated focus zone for a phase imposing according to FIG. 31.
Figure 34B:
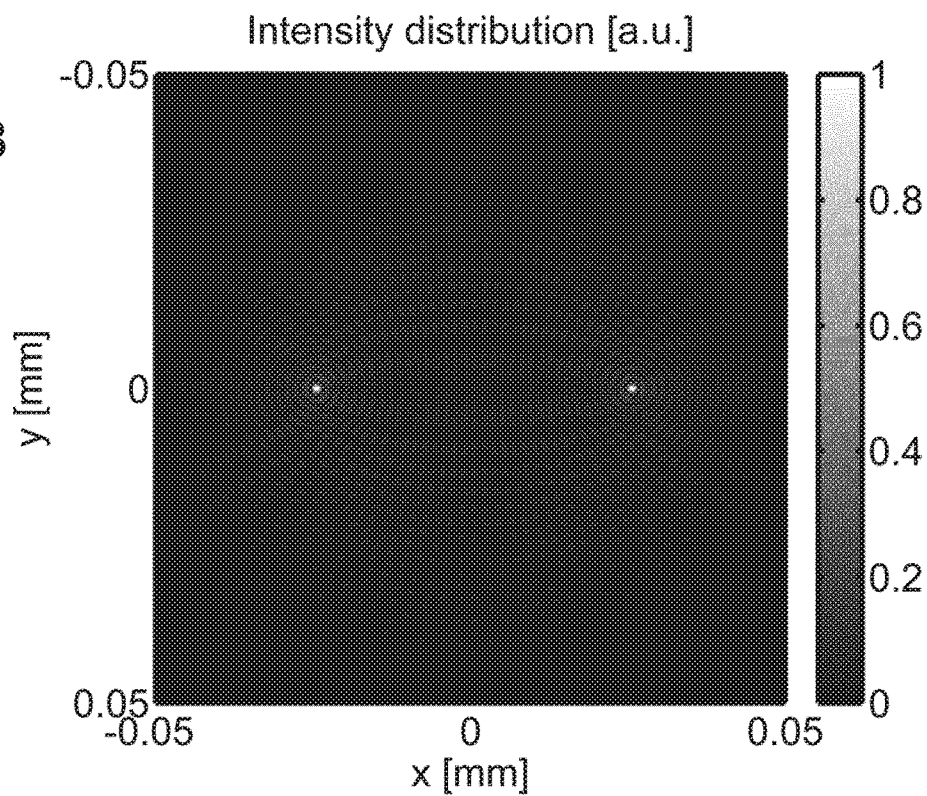
Figure 35:
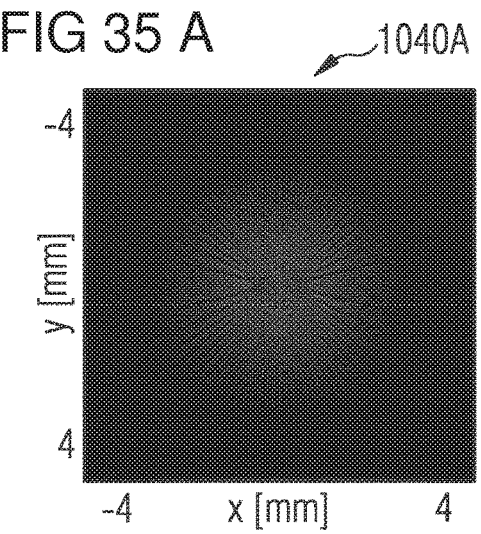
FIGS. 35A, 35B and FIG. 35C are beam profiles at z=10 mm, z=100 mm, z=150 mm for a phase imposing according to FIG. 31.
Figure 36:
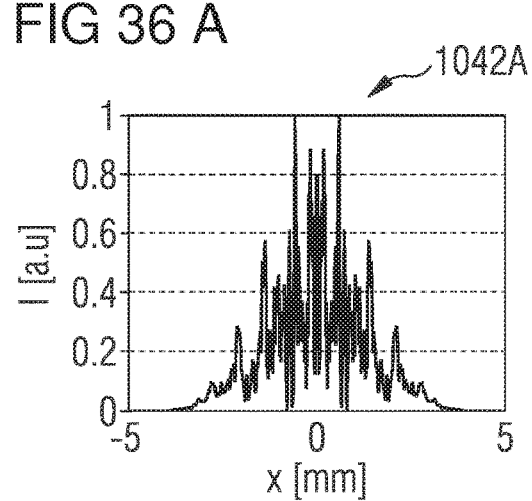
FIGS. 36A, 36B and FIG. 36C are transverse intensity distributions in X direction at z=10 mm, z=100 mm, z=150 mm for a phase imposing according to FIG. 31.
Figure 35:
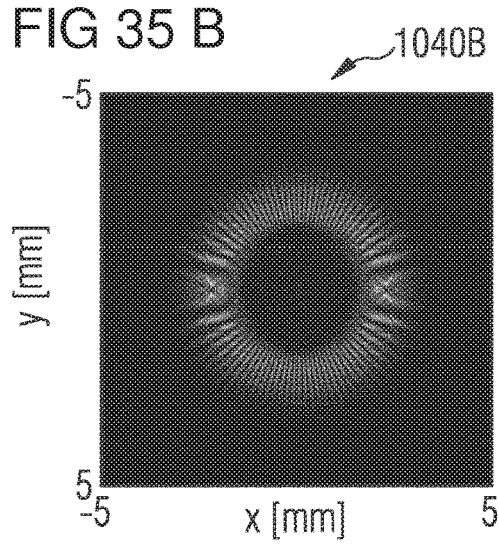
Figure 36:
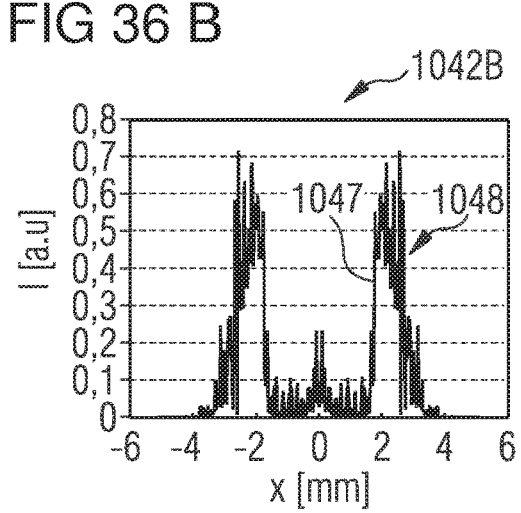
Figure 35:
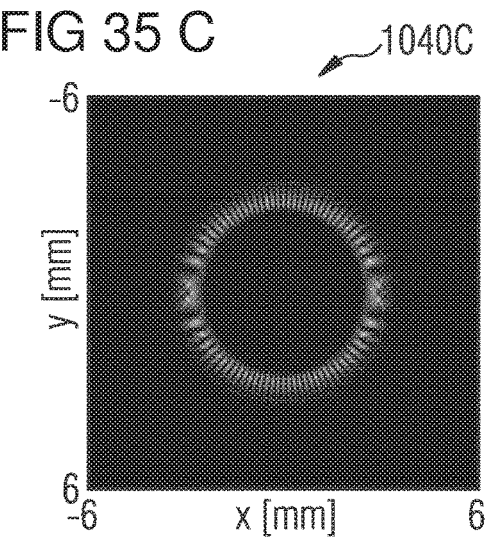
Figure 36:
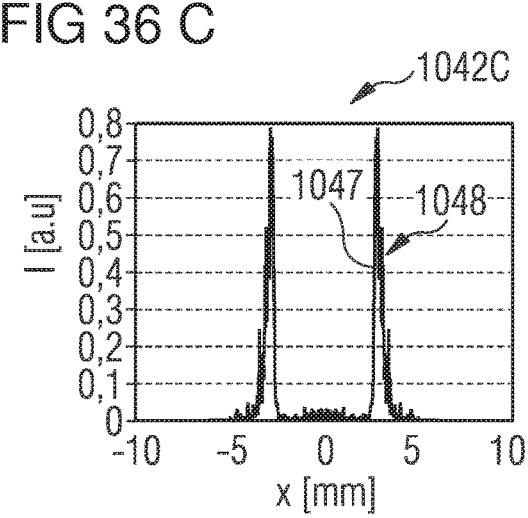

FIG. 34A shows a ZX cut through the longitudinal intensity profile and FIG. 34B shows an XY cut through the longitudinal intensity profile within the interaction area, as it is the result of the focusing of output intensity profile 1051. In particular, two elongated focus zones 1007A and 1007B are formed that are displaced in X direction and that extend in Z direction. Besides the main maximum, respective multiple secondary maxima are formed. The pulse energy or the pulse group energy can be set such that, in particular for nonlinear absorption, only the strongest maximum or the strongest of maxima of each focus zone results in a modification of the material.

If one scans the laser beam, which was formed in that manner, in Y direction over a material to be processed, a track of two modification zones at a distance is formed. Thereby, an intended tension distribution within the material can be created, which can e.g., start a separation preferably within an intermediate area 1050 between the elongated modification zones. For example, pressure tensions can build up in the modification zones, which result in the formation of tensile stress in the intermediate area that then supports the respective separating process. Here, the X direction would be again the separating direction and the Y direction would be the feed direction.

If one sets the laser parameters in dependence of the material such that a shockwave is created for the focus distribution as shown in FIGS. 34A and 34B, then the intensity distribution can also be used for the X direction as a feed direction for inserting a preferred direction of cracking by creating a separation plane between the elongated focus zones 1007A and 1007B. The two focus zones 1007A and 1007B may be in addition advantageously be generated with a small distance there-between.

The development of intensities in the respective optical system downstream of the diffractive optical beam shaping element will again have—corresponding to an inverse quasi-Bessel beam shape—a step structure in the radial intensity distribution. Due to the lateral displacement of the beam portions for the two inverse quasi-Bessel beams, interference structures 1034, however, form which can overlay with the step structure.

Despite the interference structures 1034, one can recognize areas in beam profiles 1040A to 1040C for z=10 mm, z=100 mm, and z=150 mm, which are reproduced in FIGS. 35A to 35C, that have higher intensities at the radial inner side. FIGS. 36A to 36C show respective intensity distributions 1042A to 1042C that extend radially in X direction. In particular, in FIGS. 36B and 36C, one recognizes the formation of a steep flank 1047 that surrounds an inner area of lower intensity. Herein, the intensity radially decays to the outside with a slowly decreasing flank 1047. However, the formation of the flanks is strongly dependent on the direction due to the interference, as it is shown, for example, in FIGS. 35A to 35C.

The above explained examples are based on values of two phase distributions provided on the phase mask. However, more than two phase distributions can be provided. For example, more than two phase distributions can be provided in radial and azimuthal segments, or can be included in combinations of phase steps.

Further embodiments and/or further developments of the herein disclosed aspects are summarized in the following:

In general, the herein disclosed focusing elements such as the far field optics and the near field optics can be configured as, for example, lens, mirror, DOE, or a combination thereof.

Moreover, additional optical elements can be inserted into optical systems such as the herein disclosed embodiments. Inter alia intermediate images can be inserted in the imaging system, to be able to realize, for example, a filter function as well as a scan movement in the area of the image-side focal plane. Thereby, e.g., the image-side focal plane (e.g., image plane 340 in FIG. 20) can itself be imaged by an additional optical system. Alternatively or additionally, such optical intermediate systems can allow, for example, realizing an enlarged working distance and/or a magnification of the working field for scanner application.

Regarding further developments of the diffractive optical beam shaping element, at least a plurality of beam shaping phase distributions 43 can be configured such that an incident laser beam 3 having a Gaussian intensity distribution is transferred into at least one divergent beam area 55A, 55B attributed to the virtual optical image 53. Downstream of the diffractive optical beam shaping element 31, the divergent beam area includes a transverse intensity distribution 57A, 57B, which decreases from the inside to the outside and is present in particular before a far field focal length (fF) attributed to a focusing action of the phase mask, and/or at least one of the plurality of beam shaping phase distributions 43 is configured such that an incident laser beam 3 is transferred into at least one divergent beam area 55A, 55B) attributed to the virtual optical image 53. Downstream of the diffractive optical beam shaping element 31, the divergent beam area including a transverse intensity distribution 57A, 57B that includes a section of a step-shaped intensity increase, which includes a steep flank (907) facing radially to the inside, and that is present in particular before a far field focal length (fF) attributed to a focusing action of the phase mask.

At least two segment specific phase distributions can be associated respectively with a segment-specific virtual optical image that can be imaged in a segment-specific focus zone, and the respective segment-specific focus zones are arranged with respect to each other such that they contribute together to the formation of a modification zone.

At least two segments may be composed of spatial structures that are at least partly encapsulated into each other, and/or segments of the plurality of segments join radially and/or azimuthal, wherein in particular a weighted transition between the respective neighboring phase distributions can be set in the transition area of neighboring segments of the plurality of segments.

The, in particular segment-specific, focus zones can be superposed with respect to each other and/or spatially complement each other, and/or at least two, in particular segment-specific, images of the virtual optical images are superposed while interfering, and/or at least two, in particular, segment-specific, images of the virtual optical images can form a common elongated focus zone.

Moreover, to the beam shaping element, an imaging system can attribute an image plane downstream of the longitudinal center of the image of the virtual optical image, and a transverse beam profile of the laser beam can be present at the beam shaping element in the image plane. In particular, in the area of the image plane, a fast turn up in longitudinal direction from a lateral beam profile being present in the focus zone to a lateral beam profile with a dark center may be present, the latter in particular for an essentially lateral Gaussian beam profile of the laser beam and in particular with respect to beam portions of the incident laser beam, which create a divergent beam portion, which is attributed to the virtual optical image, and/or the optical system can be configured such that essentially only a central area of the incident laser beam contributes to a downstream positioned end of the focus zone attributed to the virtual image, so that a change of a beam diameter of the incident laser beam does not result in a significant longitudinal displacement of the downstream positioned end of the focus zone.

It is explicitly stated that all features disclosed in the description and/or the claims are intended to be disclosed separately and independently from each other for the purpose of original disclosure as well as for the purpose of restricting the claimed invention independently of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

A number of embodiments of the invention have been described. Nevertheless, it will be understood that various modifications may be made without departing from the spirit and scope of the invention. Accordingly, other embodiments are within the scope of the following claims.

What is claimed is:

1. A method for material processing of a material, which is transparent to a laser beam, by generating pulsed laser beam modifications that are formed in an asymmetric manner transverse to a propagation direction of the laser beam, the method comprising:
   generating the pulsed laser beam modifications by beam shaping each laser beam pulse, of a plurality of laser beam pulses, to form, for each laser beam pulse of the plurality of laser beam pulses, an elongated asymmetric focus zone in the material, wherein the elongated asymmetric focus zone is configured such that it comprises a plurality of intensity maxima, which are transverse flattened in a flattening direction and form a transverse sequence of asymmetric intensity maxima in a sequence direction, wherein the flattening direction and the sequence direction each are transverse to the propagation direction, and
   wherein beam shaping each laser beam pulse to form the elongated asymmetric focus zone comprises:
      imposing a phase distribution, which is rotationally symmetric with respect to the beam propagation direction, onto a transverse input intensity profile of the laser beam, wherein the imposed phase distribution is such that a virtual or a real optical image, of an inverse or regular Bessel beam-like, focus zone is attributed to the laser beam;
      propagating the laser beam over a beam shaping distance, after which the imposed phase distribution has transferred the transverse input intensity profile to a transverse output intensity profile, so that the transverse output intensity profile comprises, in comparison with the transverse input intensity profile, at least one rotationally symmetric local maximum, which is located outside of the beam axis;
      blocking an angle range of the at least one rotationally symmetric local maximum; and
      focusing an unblocked portion of the rotationally symmetric local maximum to form the elongated asymmetric focus zone;
   positioning the elongated asymmetric focus zone in the material; and
   moving the material and the elongated asymmetric focus zone relative to each other in or across to the flattening direction or in or across to the sequence direction.

2. The method of claim 1, wherein, to follow an at least partially curved processing path, the sequence direction is turned, during a relative movement between the material and the focus zone, in a plane that is transverse to the propagation direction of the laser beam.

3. The method of claim 1, wherein the plurality of flattened intensity maxima is configured asymmetric in a plane that is transverse to the propagation direction of the laser beam.

4. The method of claim 1, comprising forming the asymmetric focus zone by imposing a non rotationally symmetric phase distribution on the laser beam with a diffractive optical beam shaping element having a phase distribution, which is non rotationally symmetric with respect to the beam axis.

5. The method of claim 1, wherein the blocked angle range is adapted to set an extent of the length of an envelope of the focus zone as well as of an extent of the width of the at least one rotationally symmetric local intensity maximum transverse to the extent of the length in dependence of a curvature of a feed path.

6. The method of claim 1, wherein an azimuthal position of the blocked angle range is adapted to set the sequence direction of the at least one rotationally symmetric local intensity maximum.

7. The method of claim 1, wherein the plurality of intensity maxima form an axial sequence of asymmetric intensity maxima in the propagation direction.

8. The method of claim 1, comprising forming the elongated asymmetric focus zone by:
   imposing a plurality of beam shaping phase distributions over a transverse input intensity profile of the laser beam, wherein at least one imposed beam shaping phase distribution is such that a virtual or real optical image of an elongated focus zone is attributed to the laser beam;
   propagating the laser beam over a beam shaping distance, after which the plurality of the imposed beam shaping phase distributions has transferred the transverse input intensity profile in a transverse output intensity profile, so that the transverse output intensity profile comprises, in comparison with the input intensity profile, at least one local maximum, which is located outside of the beam axis; and
   focusing the laser beam into the focus zone to form a near field, which is based on the transverse output intensity profile, while superposing, adding, or interfering the elongated focus zone attributed to the virtual or real optical image with at least one further focus zone, which is based on at least one further phase distribution of the plurality of beam shaping phase distributions, thereby creating an asymmetric transverse intensity distribution that is aligned during the material processing with respect to a target direction.

9. The method of claim 1, further comprising:
guiding a crack for separating or preparing the separation of the material, wherein successive pulsed laser beam modifications are displaced with respect to each other along a relative movement direction between the laser beam propagation direction and the material, and each of the pulsed laser beam modifications has a preferred direction in a crack formation, wherein the preferred direction depends on the material or laser beam parameters, either across to or longitudinal with respect to a length axis relating to the largest transverse extent of the pulsed laser beam modification, and the relative movement direction and the preferred direction are adapted to each other.

10. The method of claim 9, further comprising:
generating the transverse sequence of asymmetric intensity maxima in a feed direction, an intensity of the transverse sequence of asymmetric intensity maxima is lower on a feed side of the transverse sequence than on a backside of the transverse sequence; and
performing the relative movement in the feed direction, so that, at the backside, a stronger development of a preferred direction in the crack formation is present than at the feed side, so that a crack formation towards the previously created modification is initiated, but an advancing crack formation is suppressed, such that a crack formation to a previously created modification is initiated already by the creation of the modification.

11. An optical system for beam shaping of a laser beam for processing a material, which is transparent for the laser beam, by modifying the material in a focus zone that is elongated in a propagation direction of the laser beam and in a further direction transverse to the propagation direction, the optical system comprising;
an optical element configured to shape the focus zone in the propagation direction and to shape the focus zone in a further direction transverse to the propagation direction, wherein the optical element comprises a diffractive optical beam shaping element configured to impose one or more phase distributions on the laser beam;
a further optical element positioned downstream of the optical element and configured to shape the focus zone in the further direction transverse to the propagation direction, wherein the further optical element is configured as a beam aperture, such that the focus zone comprises a plurality of intensity maxima, which are transverse flattened in a flattening direction and form a transverse sequence of asymmetric intensity maxima in a sequence direction;
a near field optics arranged downstream of the optical element at a beam shaping distance and configured to focus the laser beam into the focus zone,
wherein at least one phase distribution of the one or more phase distributions causes a virtual optical image of an elongated focus zone to be located upstream of the diffractive optical beam shaping element, or causes a real optical image of the elongated focus zone to be located after the diffractive optical beam shaping element,
the beam shaping distance corresponds to a propagation length of the laser beam, within which the one or more phase distributions transforms the transverse input intensity profile into a transverse output intensity profile in a region of the near field optics, and the transverse output intensity profile has, in comparison with the input intensity profile, at least one local maximum lying outside of a beam axis, and
the beam aperture delimits the laser beam such that imaging of the attributed optical images results in an asymmetric transverse intensity distribution in the elongated focus zone that comprises the plurality of intensity maxima.

12. The optical system of claim 11, wherein the optical element comprises a phase mask configured to impose the one or more phase distributions on the laser beam incident on the phase mask, wherein the virtual optical image is attributed to at least one of the plurality of beam shaping phase distributions, the virtual optical image being imageable into at least one elongated focus zone for forming a modification in a material to be processed.

13. The optical system of claim 11, wherein at least one of the plurality of beam shaping phase distributions is configured such that a ring structure is formed in a transverse output intensity distribution upstream of the aperture.

14. An optical system for beam shaping of a laser beam for processing a material, which is transparent for the laser beam, by modifying the material in a focus zone of the laser beam that is elongated in a propagation direction of the laser beam and in a further direction transverse to the propagation direction, the optical system comprising;
an optical element comprising a diffractive optical beam shaping element configured to impose a plurality of phase distributions on the laser beam,
wherein the optical element is configured to shape the focus zone in the propagation direction and to shape the focus zone of the laser beam in the further direction transverse to the propagation direction; and
a further optical element positioned downstream of the optical element and configured to shape the focus zone in the further direction transverse to the propagation direction, wherein the further optical element is configured as a beam aperture, such that the focus zone comprises a plurality of intensity maxima, which are transverse flattened in a flattening direction and form a transverse sequence of asymmetric intensity maxima in a sequence direction
a near field optics arranged downstream of the optical element at a beam shaping distance and configured to focus the laser beam into the focus zone, wherein
at least one phase distribution of the plurality of phase distributions causes a virtual optical image of an elongated focus zone to be located upstream of the diffractive optical beam shaping element, or causes a real optical image of an elongated focus zone to be located after the diffractive optical beam shaping element,
the beam shaping distance corresponds to a propagation length of the laser beam, within which the plurality of phase distributions transforms the transverse input intensity profile into a transverse output intensity profile in a region of the near field optics, and the transverse output intensity profile has, in comparison with the input intensity profile, at least one local maximum lying outside of a beam axis.

15. The optical system of claim 14, wherein
the phase distributions of the plurality of beam shaping phase distributions are configured such that the images of attributed optical images result in an asymmetric transverse intensity distribution within the material to be processed that comprises the plurality of intensity maxima and the asymmetric transverse intensity distribution comprises a feed intensity distribution in a feed direction and a separating intensity distribution transverse to the feed direction and wherein the feed intensity distribution extends in a transverse direction further than the separating intensity distribution or the separating intensity distribution comprises two intensity maxima for separating the material between the intensity maxima.

16. The optical system of claim 14, wherein the diffractive optical beam shaping element comprises a phase mask, which is configured to impose the plurality of beam shaping phase distributions on the laser beam incident on the phase mask, wherein a virtual optical image is attributed to at least one of the plurality of beam shaping phase distributions, the virtual optical image being imagable into at least one elongated focus zone for forming a modification in the material to be processed.

17. The optical system of claim 14, wherein at least one of the plurality of beam shaping phase distributions is configured such that a ring segment structure limited to an azimuthal angle range or a local maximum is formed in a transverse output intensity distribution.

18. The optical system of claim 14, wherein
a virtual optical image is respectively attributed to several phase distributions of the plurality of beam shaping phase distributions, and the optical images are configured for being imaged in respective focus zones in order to form together the modification in the material to be processed.

19. The optical system of claim 16, further comprising:
a separate far field optics; or
a far field optics phase imposing that is integrated into the phase mask,
wherein the far field optics or the far field optics phase imposing is configured to perform a focusing action on the laser beam, in order to form the output intensity distribution for at least the one virtual optical image in a respective focal plane.

20. The optical system of claim 14, wherein the optical system is configured for forming an asymmetric transverse intensity distribution in the workpiece, which can be set in its orientation with respect to a preferred direction by rotating the diffractive optical beam shaping element.

21. A laser processing machine for processing a material with a laser beam by modifying the material in a common focus zone, which is elongated in a propagation direction of the laser beam, and the material is transparent for the laser beam, comprising:
a laser beam source;
an optical system comprising
an optical element configured to shape a focus zone of a laser beam from the laser beam source in a propagation direction of the laser beam, wherein the optical element comprises a diffractive optical beam shaping element configured to impose one or more phase distributions on the laser beam and to shape the focus zone in a direction transverse to the propagation direction and configured as a beam shaping element, and
a near field optics arranged downstream of the optical element at a beam shaping distance and configured to focus the laser beam into the focus zone,
wherein at least one phase distribution of the one or more phase distributions causes a virtual optical image of an elongated focus zone to be located upstream of the diffractive optical beam shaping element, or causes a real optical image of an elongated focus zone to be located after the diffractive optical beam shaping element,
the beam shaping distance corresponds to a propagation length of the laser beam, within which the one or more phase distributions transforms the transverse input intensity profile into a transverse output intensity profile in a region of the near field optics, and the transverse output intensity profile has, in comparison with the input intensity profile, at least one local maximum lying outside of a beam axis, and
the beam aperture delimits the laser beam such that imaging of the attributed optical images results in an asymmetric transverse intensity distribution in the elongated focus zone that comprises the plurality of intensity maxima; and
a control unit for orienting a transverse asymmetric intensity distribution with respect to a preferred direction, wherein the control unit is configured to set a rotation angle of the beam aperture with respect to the beam axis of the incident laser beam; or
wherein the control unit is configured for the alignment of the optical system and the work-piece such that a preferred direction of the workpiece processing, which is given by the asymmetric beam profile, can be adapted to the feed direction.

22. A method for material processing of a material, which is transparent to a laser beam, by generating pulsed laser beam modifications that are formed in an asymmetric manner transverse to a propagation direction of the laser beam, the method comprising:
generating the pulsed laser beam modifications by beam shaping each laser beam pulse, of a plurality of laser beam pulses, to form, for each laser beam pulse of the plurality of laser beam pulses, an elongated asymmetric focus zone in the material, wherein the elongated asymmetric focus zone is configured such that it comprises a plurality of intensity maxima, which are transverse flattened in a flattening direction and form a transverse sequence of asymmetric intensity maxima in a sequence direction, wherein the flattening direction and the sequence direction each are transverse to the propagation direction;
positioning the elongated asymmetric focus zone in the material;
moving the material and the elongated asymmetric focus zone relative to each other in or across to the flattening direction or in or across to the sequence direction;
guiding a crack for separating or preparing the separation of the material, wherein successive pulsed laser beam modifications are displaced with respect to each other along a relative movement direction between the laser beam propagation direction and the material, and each of the pulsed laser beam modifications has a preferred direction in a crack formation, wherein the preferred direction depends on the material or laser beam parameters, either across to or longitudinal with respect to a length axis relating to the largest transverse extent of the pulsed laser beam modification, and the relative movement direction and the preferred direction are adapted to each other;
generating the transverse sequence of asymmetric intensity maxima in a feed direction, an intensity of the transverse sequence of asymmetric intensity maxima is lower on a feed side of the transverse sequence than on a backside of the transverse sequence; and
performing the relative movement in the feed direction, so that, at the backside, a stronger development of a preferred direction in the crack formation is present than at the feed side, so that a crack formation towards the previously created modification is initiated, but an advancing crack formation is suppressed, such that a crack formation to a previously created modification is initiated already by the creation of the modification.

23. The method of claim 22, wherein, to follow an at least partially curved processing path, the sequence direction is turned, during a relative movement between the material and the focus zone, in a plane that is transverse to the propagation direction of the laser beam.

24. The method of claim 22, wherein the plurality of flattened intensity maxima is configured asymmetric in a plane that is transverse to the propagation direction of the laser beam.

25. The method of claim 22, comprising forming the asymmetric focus zone by imposing a non rotationally symmetric phase distribution on the laser beam with a diffractive optical beam shaping element having a phase distribution, which is non rotationally symmetric with respect to the beam axis.

26. The method of claim 22, wherein the plurality of intensity maxima form an axial sequence of asymmetric intensity maxima in the propagation direction.

27. The method of claim 22, comprising forming the elongated asymmetric focus zone by:

imposing a plurality of beam shaping phase distributions over a transverse input intensity profile of the laser beam, wherein at least one imposed beam shaping phase distribution is such that a virtual or real optical image of an elongated focus zone is attributed to the laser beam;

propagating the laser beam over a beam shaping distance, after which the plurality of the imposed beam shaping phase distributions has transferred the transverse input intensity profile in a transverse output intensity profile, so that the transverse output intensity profile comprises, in comparison with the input intensity profile, at least one local maximum, which is located outside of the beam axis; and focusing the laser beam into the focus zone to form a near field, which is based on the transverse output intensity profile, while superposing, adding, or interfering the elongated focus zone attributed to the virtual or real optical image with at least one further focus zone, which is based on at least one further phase distribution of the plurality of beam shaping phase distributions, thereby creating an asymmetric transverse intensity distribution that is aligned during the material processing with respect to a target direction.

* * * * *